(12) United States Patent
Matonick et al.

(10) Patent No.: US 9,520,073 B2
(45) Date of Patent: Dec. 13, 2016

(54) EX-VIVO ANATOMIC TISSUE SPECIMEN WOUND CLOSURE SIMULATION MODEL

(71) Applicant: Ethicon, Inc., Somerville, NJ (US)

(72) Inventors: John Matonick, Warren, NJ (US); Matthew Pfefferkorn, Bound Brook, NJ (US)

(73) Assignee: Ethicon, Inc., Somerville, NJ (US)

( * ) Notice: Subject to any disclaimer, the term of this patent is extended or adjusted under 35 U.S.C. 154(b) by 206 days.

(21) Appl. No.: 14/604,840

(22) Filed: Jan. 26, 2015

(65) Prior Publication Data

US 2016/0217710 A1  Jul. 28, 2016

(51) Int. Cl.
*G09B 23/28* (2006.01)
*G09B 23/30* (2006.01)

(52) U.S. Cl.
CPC .................... *G09B 23/306* (2013.01)

(58) Field of Classification Search
USPC .......... 434/262, 267, 270, 272, 273
See application file for complete search history.

(56) References Cited

U.S. PATENT DOCUMENTS

| | | | |
|---|---|---|---|
| 4,386,917 A | | 6/1983 | Forrest et al. |
| 5,149,270 A | * | 9/1992 | McKeown ........... G09B 23/285 434/262 |
| 5,358,408 A | * | 10/1994 | Medina .................. G09B 23/28 434/262 |
| 5,873,732 A | * | 2/1999 | Hasson ................ G09B 23/286 434/262 |
| 5,947,743 A | * | 9/1999 | Hasson ................ G09B 23/286 434/262 |
| 6,077,221 A | * | 6/2000 | Fowler, Jr. ......... A61B 17/0293 434/262 |
| 8,403,676 B2 | * | 3/2013 | Frassica ............... G09B 23/285 434/267 |
| 8,469,716 B2 | | 6/2013 | Fedotov et al. |
| 8,480,405 B2 | * | 7/2013 | Hammerman ....... G09B 23/285 434/267 |
| 2008/0064017 A1 | * | 3/2008 | Grundmeyer, II ..... G09B 23/28 434/262 |
| 2014/0342334 A1 | | 11/2014 | Black et al. |

FOREIGN PATENT DOCUMENTS

| | | |
|---|---|---|
| CN | 2440451 | 8/2001 |
| CN | 201157375 | 12/2008 |
| CN | 201877057 | 6/2011 |
| CN | 201955979 | 8/2011 |
| CN | 202404816 | 8/2012 |
| CN | 202549147 | 11/2012 |
| CN | 103000073 | 3/2013 |

* cited by examiner

*Primary Examiner* — Kurt Fernstrom
(74) *Attorney, Agent, or Firm* — E. Richard Skula

(57) ABSTRACT

A novel system and apparatus for testing surgical fastening devices in an ex-vivo body wall wound closure simulation device is disclosed. The system is particularly useful with simulating abdominal wall wound closure. The system has a body wall curvature approximator device, a tissue fixation system, and a tissue support and tensioner device. The system provides for anatomically correct presentation and tensioning on body wall tissue specimens for ex-vivo wound closure simulation. The system may also be used for other anatomic tissue specimens in addition to body walls.

33 Claims, 34 Drawing Sheets
(33 of 34 Drawing Sheet(s) Filed in Color)

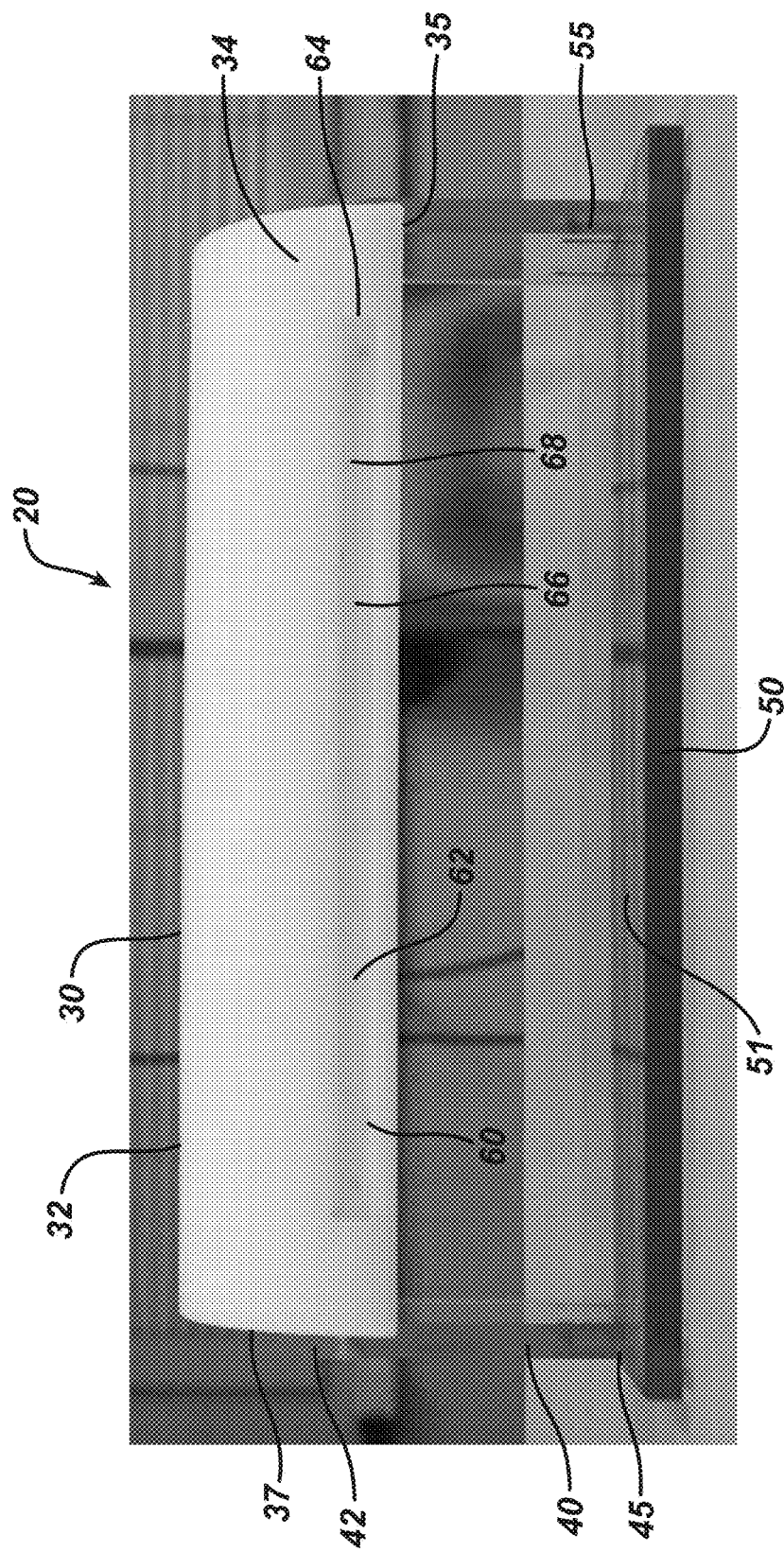

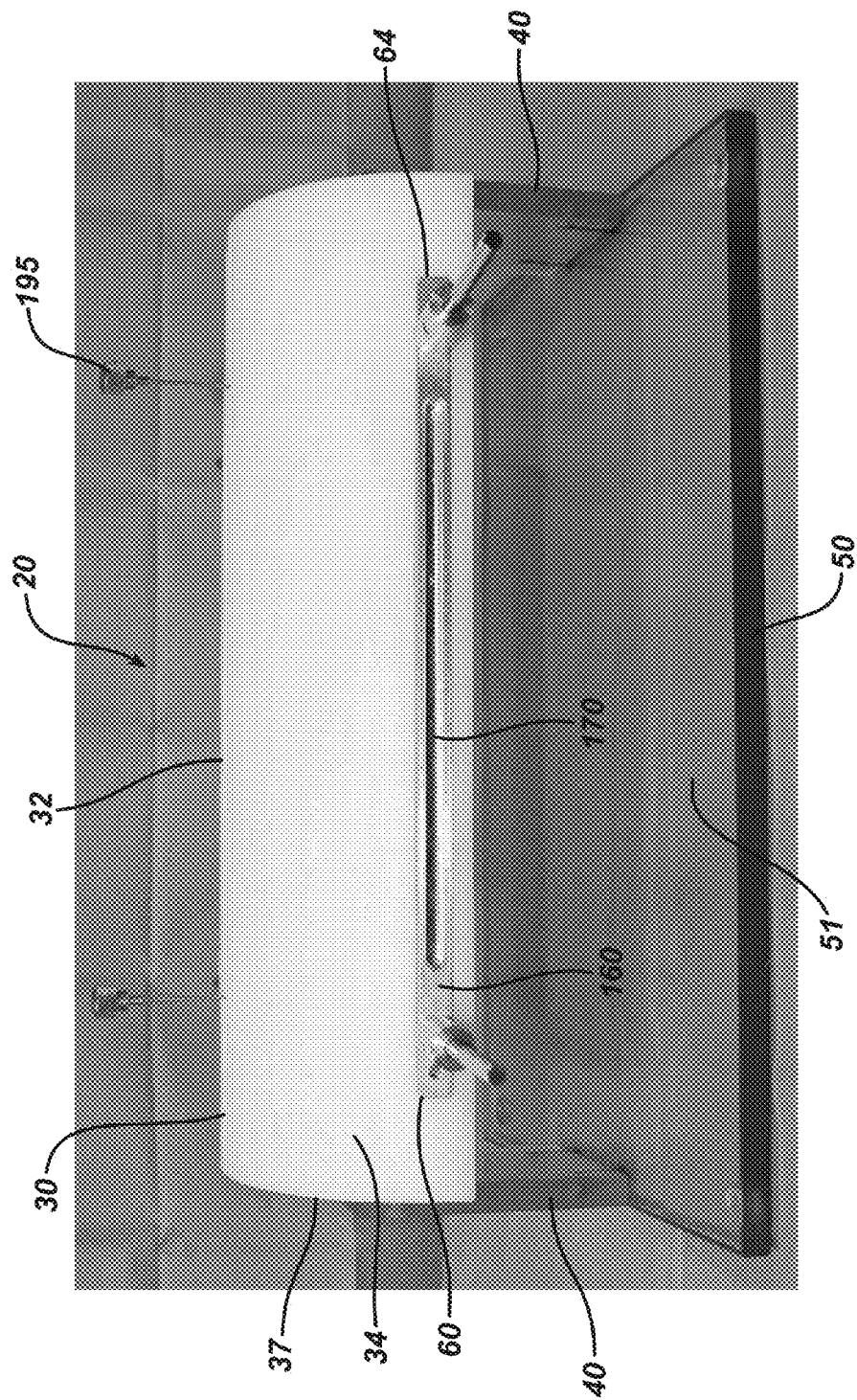

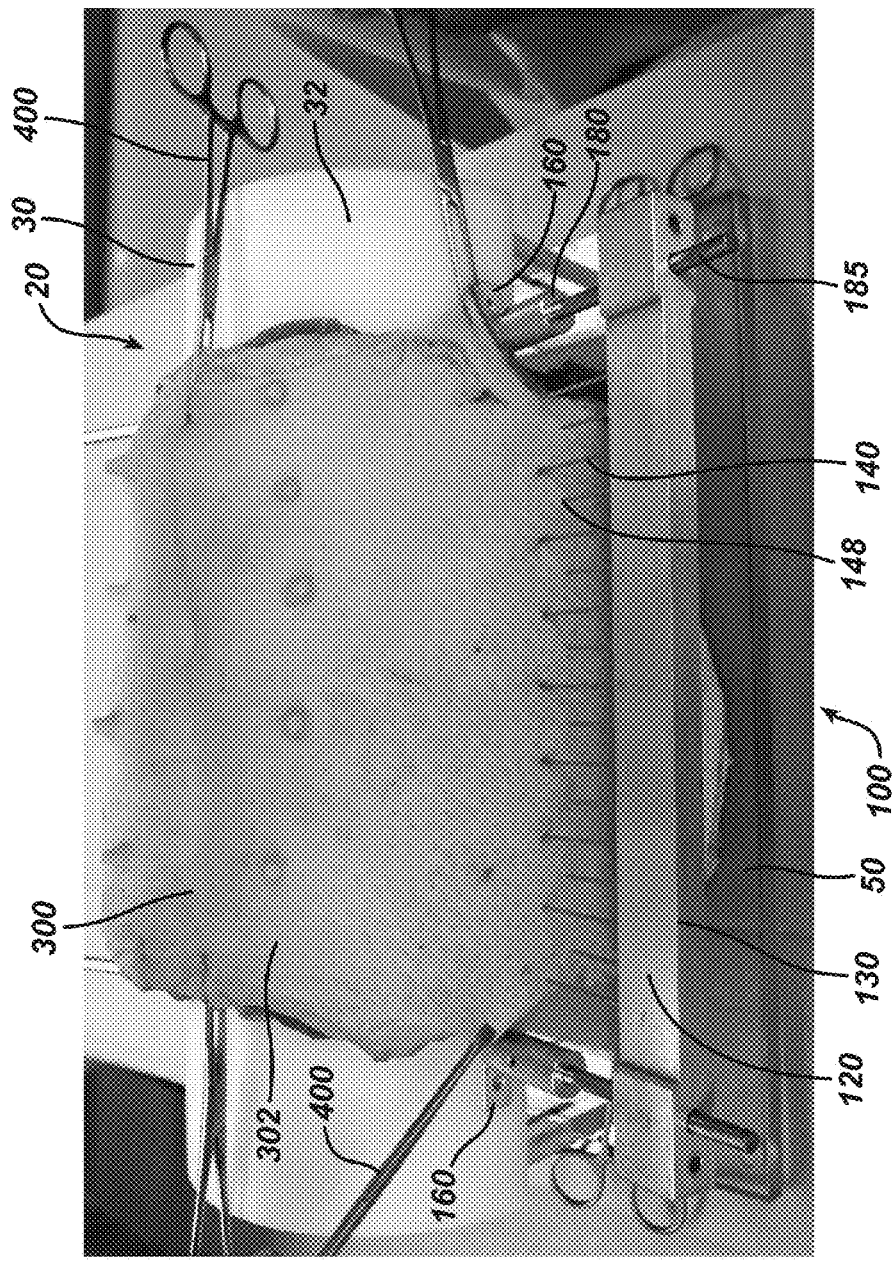

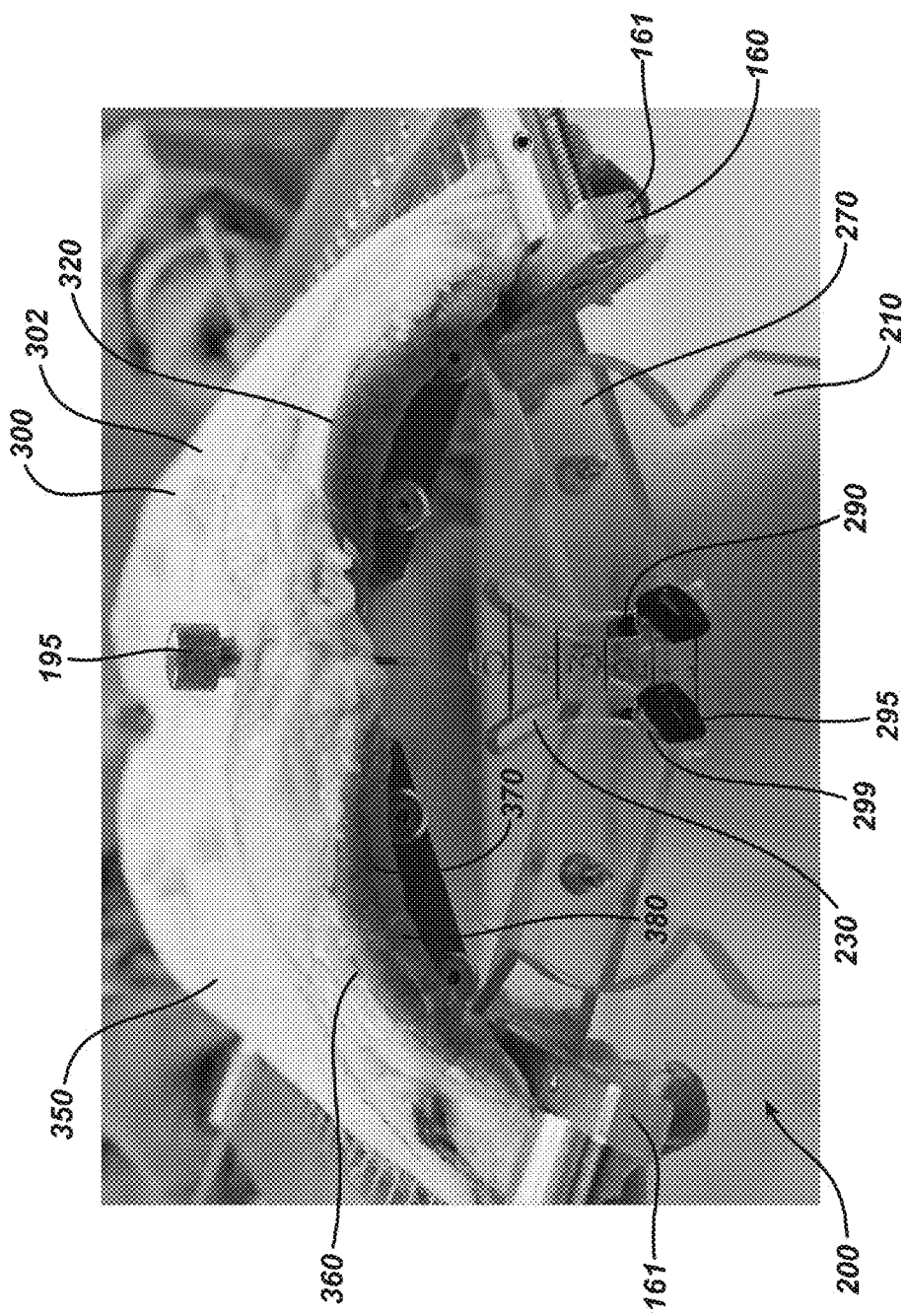

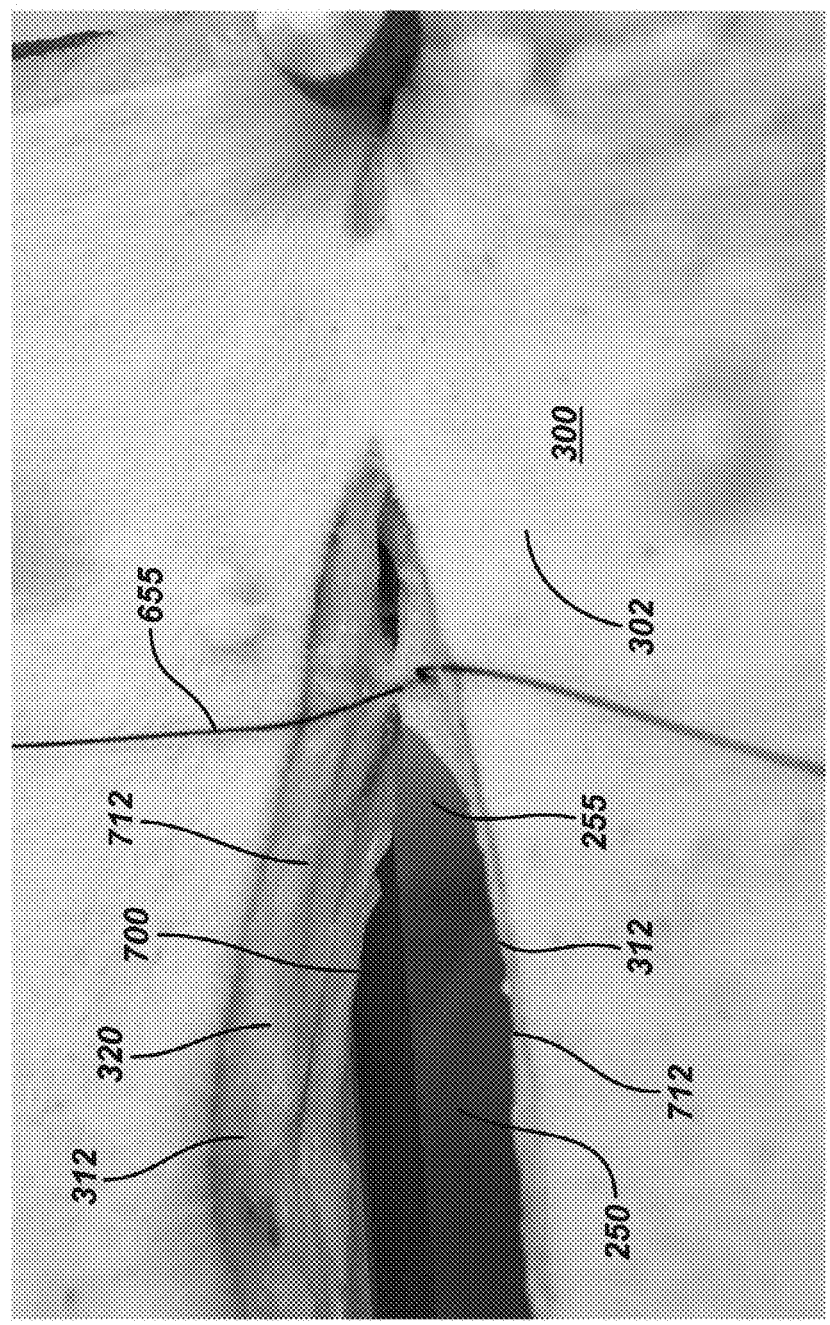

EX-VIVO ANATOMIC TISSUE SPECIMEN WOUND CLOSURE SIMULATION MODEL

FIELD OF THE INVENTION

The field of art to which this invention relates is medical devices, more specifically, testing systems and apparatus for testing surgical wound closure or fastening devices.

BACKGROUND OF THE INVENTION

Wound closure conventionally involves the use of sutures, staples, glues or combinations of these devices by the surgeon or medical practitioner to approximate tissue. The wound closure devices need to be easy for the surgeon to use, capable of rapid deployment and implantation, and the devices also need to provide superior wound closure patient outcomes. The design and assessment of these devices requires testing of the products in models that closely represent the surgical in-vivo state of the tissue. In addition, it is important for the inexperienced surgical practitioner to gain wound closure skills by practicing on ex-vivo models. Devices and systems have been developed for such testing, but have several deficiencies. One currently used and known technique for mounting tissue includes a flat mounting of the tissue specimen via cable ties or string (e.g., suture) to a static frame. The model consists of four (4) rods mounted in a square. The cable ties or string are inserted through the full thickness tissue sample and individually wrapped around the rods and secured in place by knotting or tightening the cable ties. The resulting tissue mount provides discrete points of fixation, which increases the level of tension at each fixation point, resulting in non-uniform distribution of tension, and allows the tissue to sag and hammock. Another currently used technique for fixation of a tissue sample includes a textured clamping surface, which pinches the tissue. The clamping of the tissue in this manner disrupts the integrity of the tissue properties and results in inadequate fixation where regions of the tissue are squeezed out from over-compression. The deficiencies of prior art techniques are significant in that the flat mounting of the tissue results in a distribution of forces not seen in vivo, and testing closure devices in such models does not replicate in vivo closure in several significant aspects. Body structures such as an abdominal wall are curved structures. Placing incisions in a flat, tensioned tissue specimen will result in tissue openings that are different from in vivo incisions in the following manner. The abdominal wall is a multi-layer structure, and other tissue specimens are also typically multi-layered. When tensioned in a flat manner, the individual layers are tensioned differently, resulting in the external layer not being tensioned enough and the internal layers being over tensioned. The resulting tissue opening is inconsistent along the full thickness abdominal wall. When testing wound closure devices on such flat tissue incisions, the tissue will not behave in a manner completely representative of in vivo performance. Secondly, training surgeons and medical practitioners in wound closure techniques on flat tissue specimen models will not produce transferable skills useful in applying the wound closure skills to in vivo wound closure procedures. Similar problems are associated with other curved body structures including body walls, etc.

There is a need in this art for novel systems and device for the ex vivo testing of wound closure devices under conditions simulating in vivo use of the devices. There is a further need for novel systems and devices for the ex vivo training of surgeons and medical practitioners in the use of wound closure devices under conditions simulating in vivo use of the devices.

SUMMARY OF THE INVENTION

A novel ex vivo anatomic tissue specimen wound closure simulation system for the testing and evaluation of wound closure devices used on an anatomic tissue specimen, such as an abdominal wall or other body wall, for full or partial wall thickness incisions is disclosed. The system is also useful with other types of tissue specimens in addition to body walls. The system has a tissue specimen curvature approximator device having an approximator member. The approximator member has opposed ends, a top surface having a curvature, and a bottom surface. The curvature of the top surface corresponds to the curvature of a tissue specimen in vivo. The approximator member has a support structure mounted to the member. The system has a tissue fixation system. The tissue fixation system has a pin rail; the pin rail has an elongated member with a plurality of tissue engagement pins extending from a surface. The tissue fixation system also has a receiver rail for engaging the pin rail. The receiver rail has an elongated receiver rail member with at least one guide pin, and a groove along at least part of the length of the elongated member for receiving distal ends of the tissue engagement pins. The system also has a tissue support and tensioner device for receiving the tissue fixation system. The tissue support and tensioner device has at least one tissue support member having a curvature, the curvature corresponding to the curvature of a tissue specimen in vivo. The tensioner device has a pair of end plate members mounted to the ends of the tissue support member, a pair of tensioning arms pivotally mounted to each plate member, and members associated with the lateral ends of the tensioning arms to receive at least a section of the receiver rails.

Another aspect of the present invention is a novel ex vivo anatomic tissue specimen wound closure simulation system for the testing and evaluation of wound closure devices used on anatomic tissue specimens, such as an abdominal wall or other body wall, for full or partial wall thickness incisions. The system is also useful with other types of tissue specimens in addition to body walls. The system has a tissue fixation system. The tissue fixation system has a pin rail, the pin rail has an elongated member with a plurality of tissue engagement pins extending from a surface. The tissue fixation system has a receiver rail for engaging the pin rail. The receiver rail has an elongated receiver rail member with at least one guide pin, and a groove along at least part of the length of the elongated member for receiving distal ends of the tissue engagement pins. The system also has a tissue support and tensioner device for receiving the tissue fixation system. The support and tensioner device has at least one tissue support member having a curvature, the curvature corresponding to the curvature of a tissue specimen in vivo. The tensioner device has a pair of end plate members mounted to the ends of the tissue support member, a pair of tensioning arms pivotally mounted to each plate member, and members associated with the lateral ends of the tensioning arms to receive at least a section of the receiver rails.

Yet another aspect of the present invention is a method of using the above described systems to test, evaluate, and use medical wound closure devices.

These and other aspects and advantages of the present invention will become more apparent from the following description and accompanying drawings.

BRIEF DESCRIPTION OF THE DRAWINGS

The application filed contains at least one drawing executed in color. Copies of this patent or patent application with color drawing(s) will be provided by the Office upon request and payment of the necessary fee.

FIG. 2B is a photograph showing a side view of the abdominal wall curvature approximator of FIG. 2A; a receiving slot for a rail is seen.

FIG. 2D is a side view of the approximator of FIG. 2C additionally showing two tissue retaining pins mounted in pin receiver holes on opposite ends of the top of the approximator.

FIG. 9A is a side view of the tissue specimen and abdominal wall curvature approximator of FIG. 8. A pin rail is mounted to the guide pins of the side rail. The tissue piercing pins are seen to be partially engaged with the tissue specimen.

FIG. 10C is an end view of the tissue specimen mounted to the tensioner device. End securement pins are seen at the top of each side of the tissue to secure the tissue during tensioning.

FIGS. 14A-B show fascia layer suture closure using conventional surgical needles and sutures.

DETAILED DESCRIPTION OF THE INVENTION

The present invention provides a novel system and method for the fixation and re-establishment of the anatomical and physiological tissue response for the assessment and testing of wound closure devices. The term wound closure devices is defined to have its conventional meaning to include medical devices used to close wounds by approximating layers of tissue. Examples of wound closure devices include, but are not limited to, conventional surgical needles and sutures, staples, glues, screws, adhesives, tacks, and equivalents and combinations thereof. The wound closure devices may be made from conventional biocompatible materials that are absorbable, nonabsorbable, or combinations of absorbable and nonabsorbable. Examples of nonabsorbable materials include surgical grade metals such as surgical stainless steel, tungsten-rhenium alloys, Nitinol, and the like. The nonabsorbable materials may also include ceramics, and, polymers such as polyolefins, polyesters, nylon, and the like. The absorbable materials may include known bioabsorbable polymers such as polylactic acid, polyglycolic acid, epsilon-caprolactone, polydioxanone, and blends and copolymers thereof.

Figure 1:
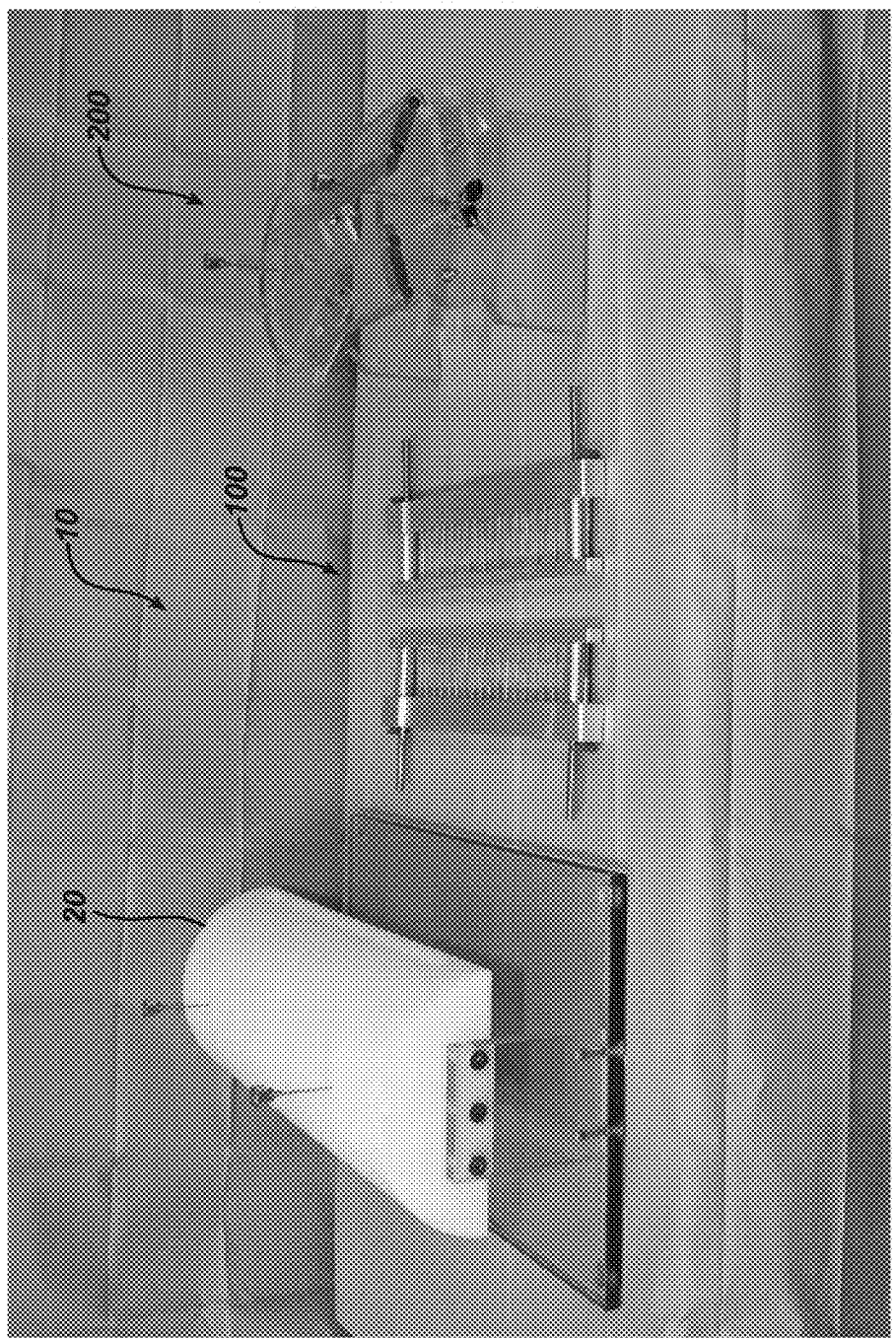
FIG. 1 is a photograph showing a perspective view of a system of the present invention useful in an ex-vivo abdominal wall wound closure model.

Referring to FIG. 1, a system 10 of the present invention to provide for ex vivo abdominal wound closure that allows for accurate simulation of in vivo abdominal wall wound closure is seen. The novel system may also be used for accurate wound closure simulation on other types of anatomic tissue specimens, including body walls and curved structures, both natural and synthetic. System 10 is seen to consist of an abdominal wall curvature approximator 20, a tissue fixation system 100 and a tissue support and tensioner 200. As seen in FIGS. 2A-D, tissue approximator 20 is seen to have tissue mounting member 30. Mounting member 30 has a curved top surface 32 connected to curved lateral side surfaces 34, and bottom surface 35. Bottom surface 35 is preferably flat but may have other geometric configurations. The radius of curvature of top surface 32 and side surfaces 34 approximates the abdominal curvature of the mammal from which an abdominal tissue specimen is harvested. It should be noted that when used with other types of curved anatomic tissue specimens, the radius of curvature may approximate other shapes, depending upon the type of tissue specimen and/or body structure and the body location from where it was harvested, thus creating conditions as desired such as high tension or low tension. This radius of curvature replicates the shape of the pre-harvested tissue. Member 30 has opposed flat ends 37, but the ends may have other geometric configurations, e.g., curved. Mounted to each side 37 is a side support member 40, having a top 42 and bottom 45. The bottom 45 of each side support member 40 is mounted to the top surface 51 of the optional support plate 50. The side support members are mounted to the ends 37 and top surface 51 by conventional fasteners, such as the screws 55. If desired the side support members 40 may be replaced by a single support structure such as, for example, a pedestal base. Member 30 may be optionally mounted in an articulating manner to the support structure or the support members 40 so that the member 30 may be articulably positioned. Contained in each lateral side surface 34 of member 30 is an elongated receiving groove 60. Receiving groove 60 is seen to have elongated cavity 62, opposed ends 64, opposed sides 66 and bottom 68.

An embodiment of the tissue fixation system 100 is seen in FIGS. 3A-F. The tissue fixation system 100 is used in the system 10 as a pair, mounted to either side of the abdominal wall curvature approximator 20 in the receiving grooves 60. Each tissue fixation system 100 is seen to have a pin rail 120 and a receiver rail 160. Pin rail 120 is seen to have elongated member 130 having top side 132, bottom side 134, opposed lateral sides 136 and opposed ends 138. Pin receiving openings 139 are seen to extend through end 138. Screw receiver openings 137 are also contained in ends 138. Optionally, the openings 137 may have screw threads. The tissue engagement pin members 140 are seen to be mounted to bottom side 134 of member 130 and to extend outwardly. Specifically, pin members 140 are seen to have bottoms 142 mounted in or to bottom side 134 of member 130, body members 144 and distal piercing tips 148 extending from distal ends 146. The pins 140 are seen to have staggered lengths along the length of member 130, alternating between longer and shorter lengths. If desired, all of the pins 140 may have the same length, or the pins 140 may have a variety of lengths mounted in various desired patterns. The pins 140 may be mounted to member 130 in a variety of conventional manners including set screws, welding, adhesives, glues, etc. Preferably, the pins 140 are readily removable from the member 130 for replacement in the event that the pins 140 are bent or become dull. As illustrated, the pins 140 are mounted to member 130 through bottom side 140 using set screws 150, and may be mounted in other conventional manners.

The receiver rail 160 is seen to be an elongated member 161 having top side 162, bottom side 164, opposed lateral sides 166, and opposed ends 168. Opposed ends 168 have screw receiver openings 169 extending there through and having screw threads. Top side 162 is seen to have groove 170 for receiving at least a portion of the distal ends 146 and piercing points 148 of pin members 140. Groove 170 is seen to have cavity 172, opposed sides 174, opposed ends 176 and bottom 178. Extending up from either end of top side 162 are the standoff members 180. Standoff members 180 are cylindrical members having bottoms 181 and tops 182. The members 180 may be mounted to member 161 in a conventional manner, e.g., screws, welding, etc., or may be manufactured with member 161 as a unitary piece. Extending from tops 182 are the alignment pins 185. Screws 190 having threads 191 are used to hold the pin rail 120 and the receiver rail 160 in place. As shown, the distal end 193 is threaded, however if desired, the entire screw 190 may be threaded with threads 191. Threads 191 are engageable with the threads in receiver openings 169. The screws 190 also have head members 194. The alignment pins 185 are seen (as illustrated) to be mounted in and extend from standoff members 180 and secured in place by set screws 186. If desired, the standoff member 180 and the alignment pin 185 may be manufactured as a unitary member. The fully assembled fixation systems are seen in FIGS. 3A-3F with the systems 100 mounted to the tissue mounting member 30 of the abdominal wall curvature approximator 20 as they would be when engaging a tissue specimen.

Figure 5A:
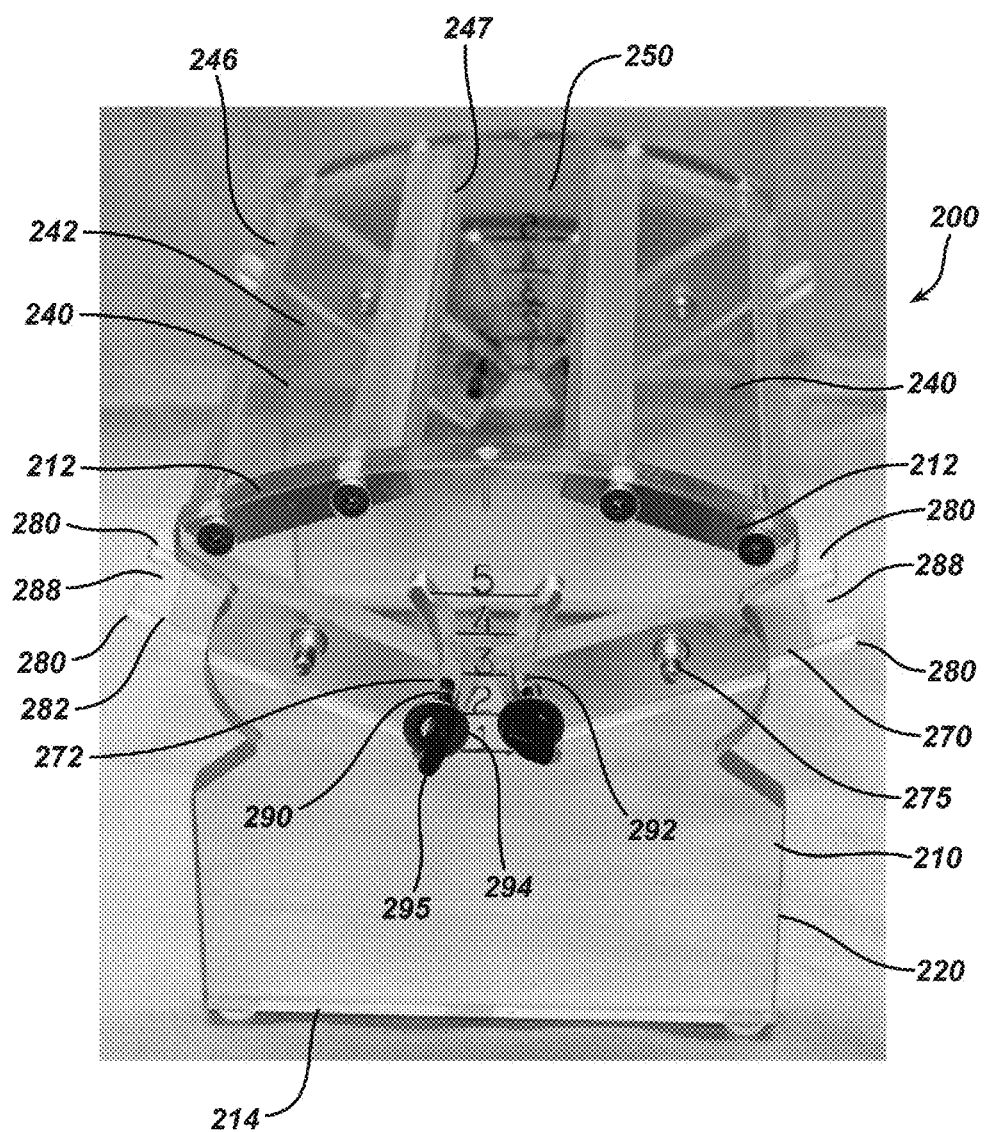
FIG. 5A is an end perspective view of a tissue support and tensioner device of the present invention.
Figure 5B:
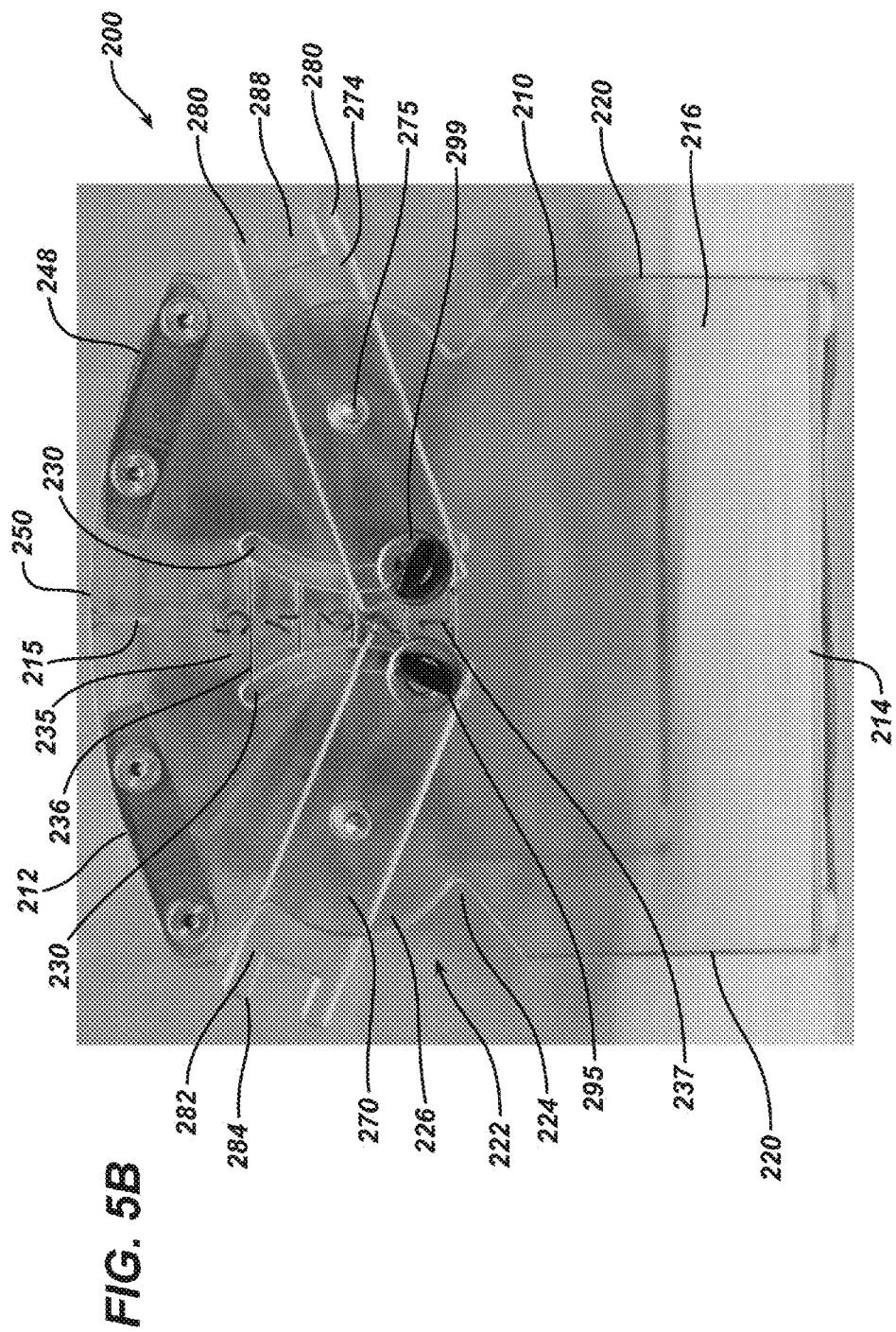
FIG. 5B is an end view of the device of FIG. 5A.
Figure 5C:
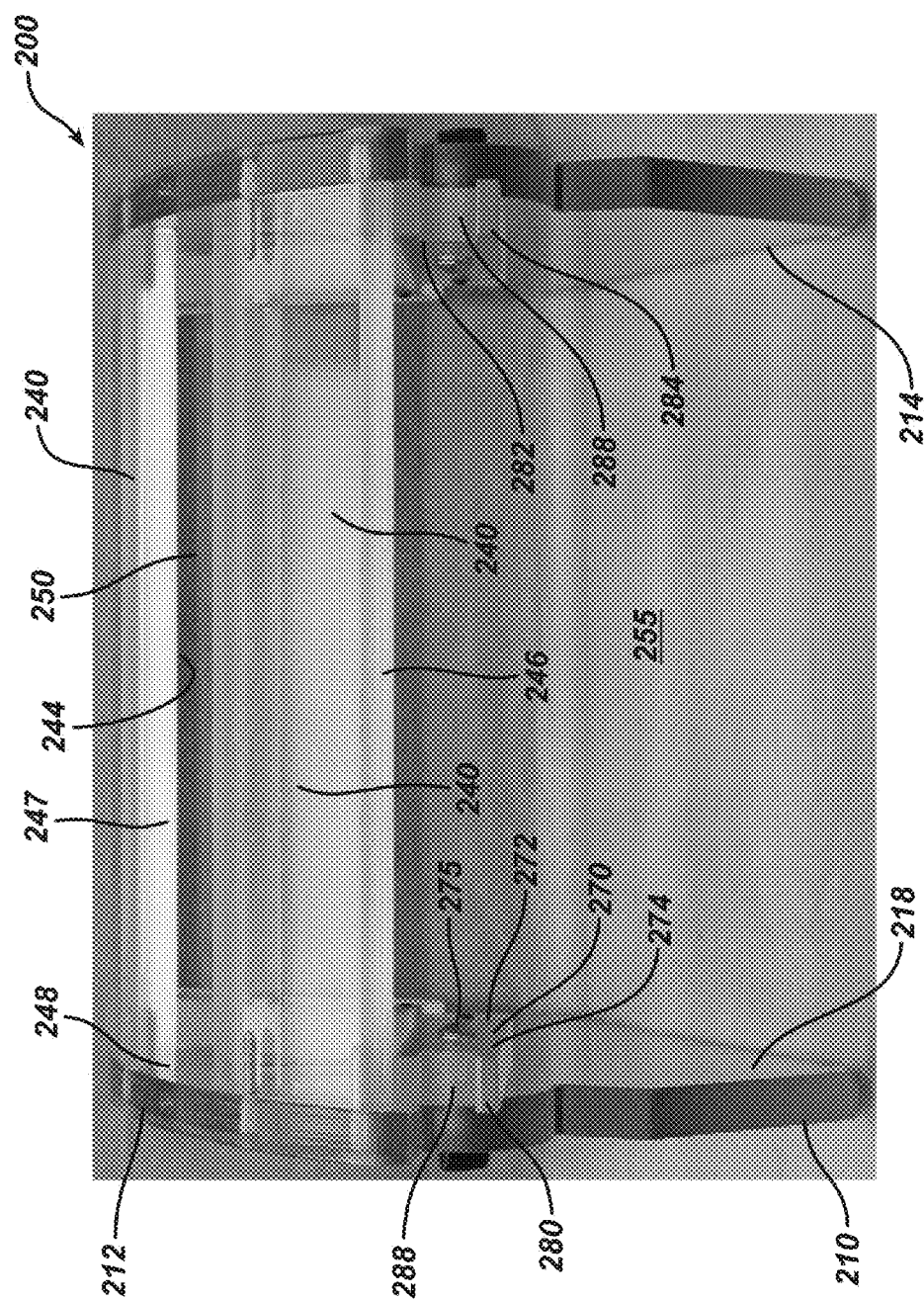
FIG. 5C is a side view of the device of FIG. 5A.
Figure 5D:
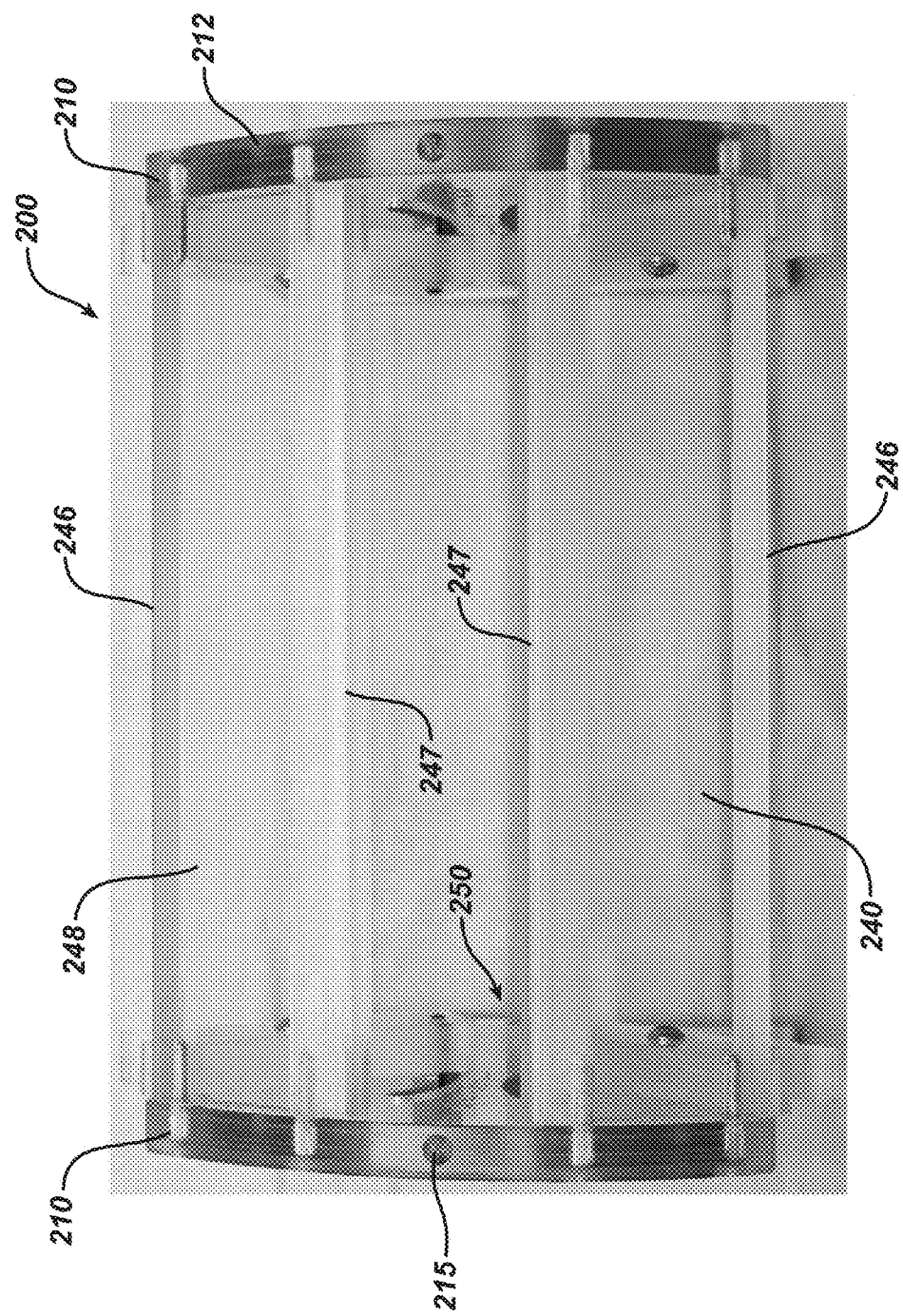
FIG. 5D is a top view of the device of FIG. 5A.
Figure 5E:
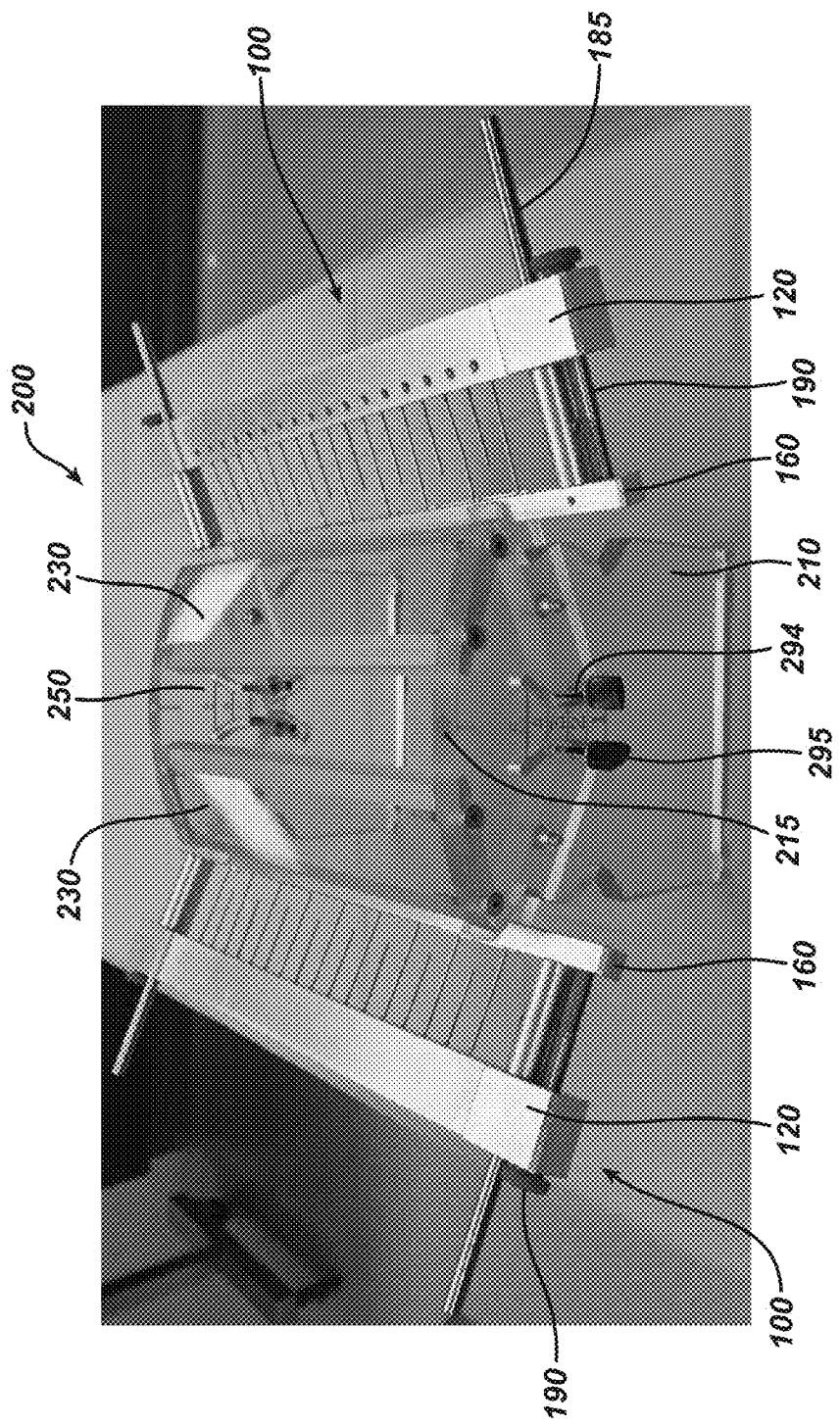
FIG. 5E is an end perspective view of a tissue support and tensioner device of FIG. 5A having a tissue fixator system mounted to the tensioning arms on each opposed side.

The tissue support and tensioner device 200 of the system 10 of the present invention is seen in FIGS. 5A-E. The system 200 is seen to have side supports 210. Side support members 210 are seen to have curved top sides 212 and flat bottom sides 214. Extending into the top sides 212 are the end pin openings 215 for receiving tissue engagement pins 195. The side support members 210 are also seen to have outer sides 216 and inner sides 218. Connecting the bottom sides 214 and the top sides 216 are the lateral sides 220. The lateral sides 220 are seen to have cut-out sections 222 having notches 224 on either side of curved protruding section 226. The curved slots 230 are seen to extend through side support members 210 from outer side 216 to inner side 218. Each side support member 210 has a pair of curved slots 230 extending therethrough and positioned and arranged such that the slots 230 are mirror images of each other. If desired the side support members 210 may be replaced by a single support structure such as, for example, a pedestal base. Mounted to the side support members 210 adjacent to top sides 212 are the tissue support members 240. Tissue support members 240 are seen to be elongated members having top sides 242 and bottom sides 244, outer lateral sides 246, inner lateral sides 247, and opposed ends 248. Tissue support members 240 have a radius of curvature similar or identical to the radius of curvature of the top sides 216 of the side support members 210, and similar to the radius of curvature of curved surface 32 of abdominal wall curvature approximator 20. The tissue support members 240 are mounted to the side support members 210 such that there is a gap or opening 250 between the inner lateral sides 247. The gap 250 allows surgical instruments and medical devices such as scalpels, trocars, etc. to penetrate through a tissue specimen to a cavity 255 contained below the members 240. In an alternate embodiment, a single tissue support member 240 is used having an appropriately sized gap or opening 250 formed therein. Similarly, wound closure medical devices, tissue attachment devices, and applicators, etc., may similarly penetrate a tissue specimen and enter, at least in part, cavity 255. Tissue support members or member 240 may be optionally mounted in an articulating manner to the support structure or the support members 210 so that the tissue support member or members 240 may be articulably positioned. Cavity 255 is seen to be defined by the inner sides 218 of support members 210 and the bottom sides 244 of the tissue support members 240. The tension adjustment arms 270 are seen to be pivotally mounted to the side support members 210. Each pivot arm 270 is seen to have a proximal end 272 and a distal end 274. Extending outwardly from each distal end 274 is a pair of fork members 280 separated by a gap 288. The fork members 280 are seen to have fixed proximal ends 282 and free distal ends 284. The fork members 280 are capable of limited rotation about fixed proximal ends 282 in a living hinge manner. Outward rotation (i.e., away from the gap) of the distal ends 284 along with a section of members 280 via the application of a force will open up the gap 288 to receive and retain a section of receiver rail 160. It will be appreciated that alternative embodiments of a retention structure may be utilized on the pivot arms 270 such as conventional pins, receptacles, and other mating or engagement structures. As mentioned previously, the tension adjustment arms 270 are pivotally mounted to the support members 210. This is done in a conventional manner such as by the use of a pivot pin or screw 275 extending into and connecting the arms 270 and support member 210. Extending outwardly from the proximal ends 272 of the arms 270 are the manipulating pins 290. Pins 290 are seen to have proximal ends 292 mounted to ends 272 of arms 270 and distal ends 294 having gripping pads 295. Pins 290 are seen to extend into and out of slots 230 such that distal ends 294 and pads 295 extend out from slots 230 adjacent to outer surfaces 216. Centered between the slots 230 and on the surface 216 of members 210 are the grid scales 235 consisting of number grid lines 236 and corresponding numbers 237. Engagement of the finger pads 295 will cause the pin 290, tensioning arm 270, and fork member 280 to move or rotate about the pivot pin 275, either up or down. The tensioning arms 270 may be locked in position using a locking mechanism associated with pin 290. As shown, the locking mechanism is provided by pin 290 having screw threads and by having a washer 299 mounted over pin 290 next to outer side 216; the arms 270 can be locked in position by rotating pin 290 in one direction, and unlocked by rotation in the opposite direction. Referring to FIG. 5E, a tissue fixation system 100 is seen mounted to the gaps 288 between fork members 280 on each lateral side of the support and tensioner device 200, and held in place in a force fit or interference fit manner.

Figure 4:
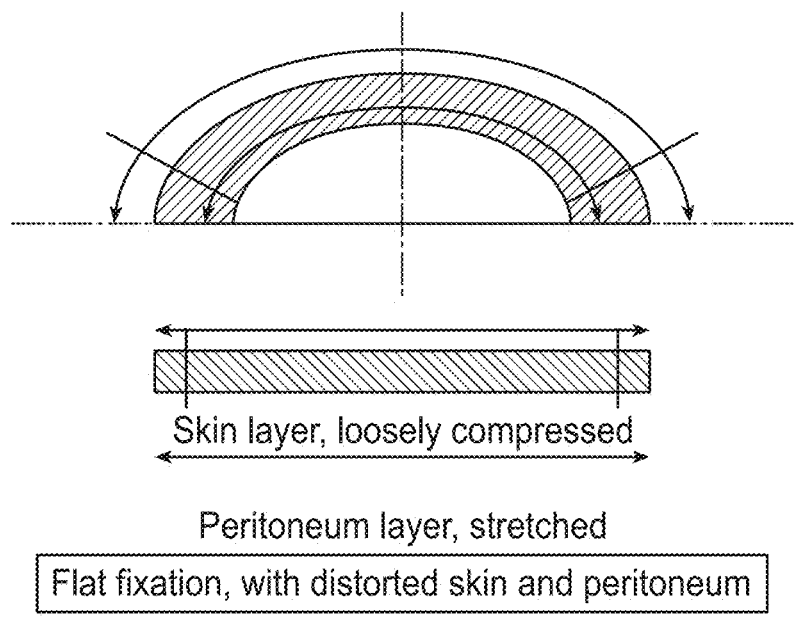
FIG. 4 is a schematic showing the differences between curved fixation of tissue specimens versus flat fixation.
Figure 15:
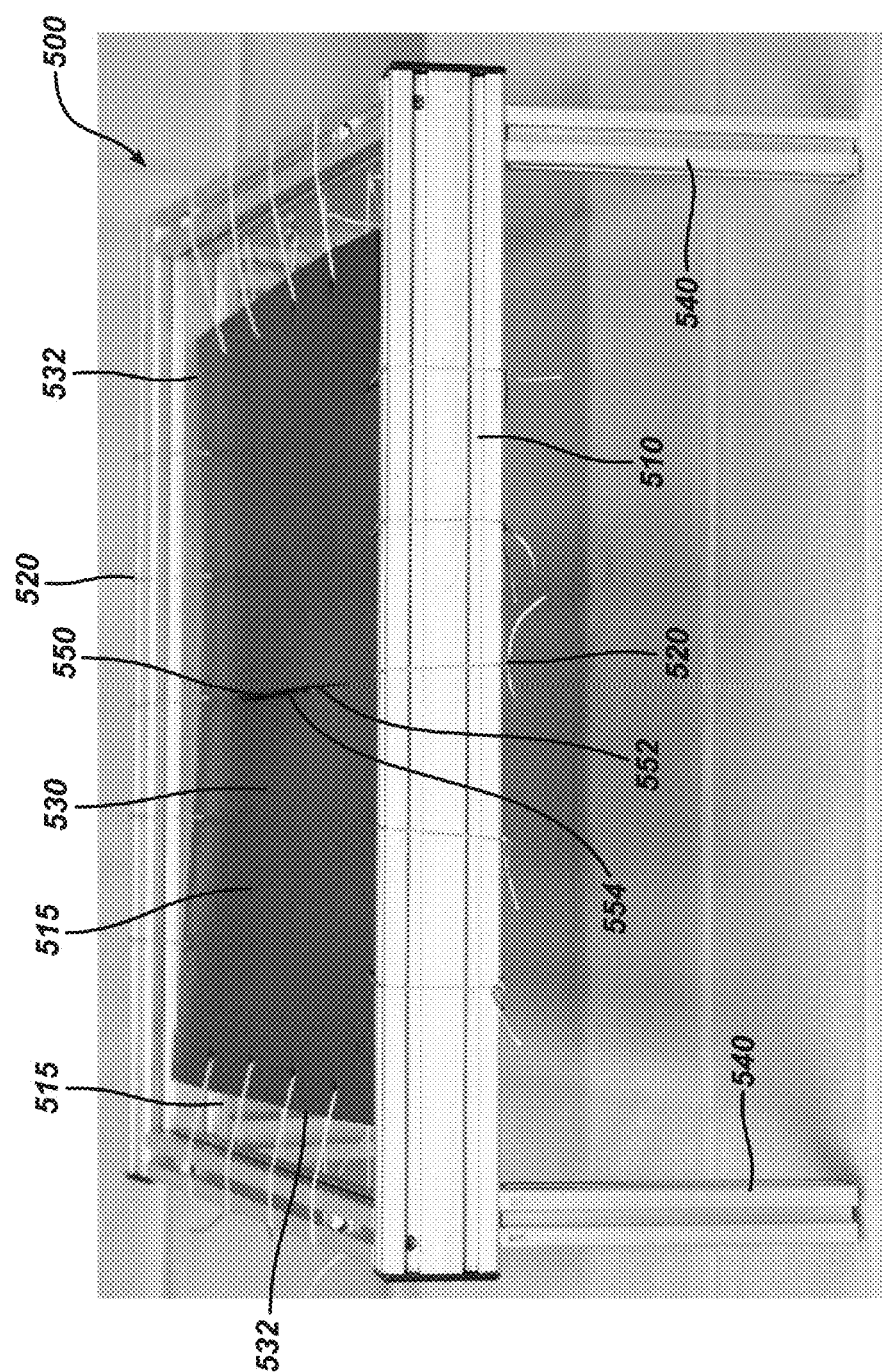
FIG. 15 illustrates a tissue simulation device of the prior art; a synthetic specimen is mounted in the device.

As seen in FIG. 4, the novel wound closure simulation system of the present invention provides a superior, anatomically correct tissue specimen for testing wound closure medical devices and applicators or practicing the closure of wounds using wound closure medical devices and applicators. It can be seen that in a prior art system, the tissue specimen is not anatomically correct since the skin is loosely compressed and distorted and the peritoneum is stretched and distorted. A wound closure simulation and testing device 500 of the prior art is seen in FIG. 15. The device 500 is seen to have a rectangular peripheral frame 510 supported by legs 540. The frame 510 is seen to have central opening 515. A flat sheet of polymer membrane 530 is seen to be mounted in the opening 515 by a plurality of sutures 520 that penetrate the membrane 530 at discrete locations about the periphery 532 of membrane 530, providing point attachment to peripheral frame 510. Membrane 530 is seen to have a central incision 550. The incision 550 is seen to have opposed sides 552 which are separated by the gap 554. The gap 554 is seen to have an unnatural, distorted appearance, and the membrane 530 is seen to sag. An abdominal wall tissue specimen mounted in prior art device 500 would similarly have an unnatural distorted appearance, since as illustrated in FIG. 4, the outer skin layer would be loosely compressed and overly loose and the peritoneum layer would be stretched and overly tight.

The following example is illustrative of the principles and practice of the present invention, although not limited thereto.

EXAMPLE

Figure 2A:
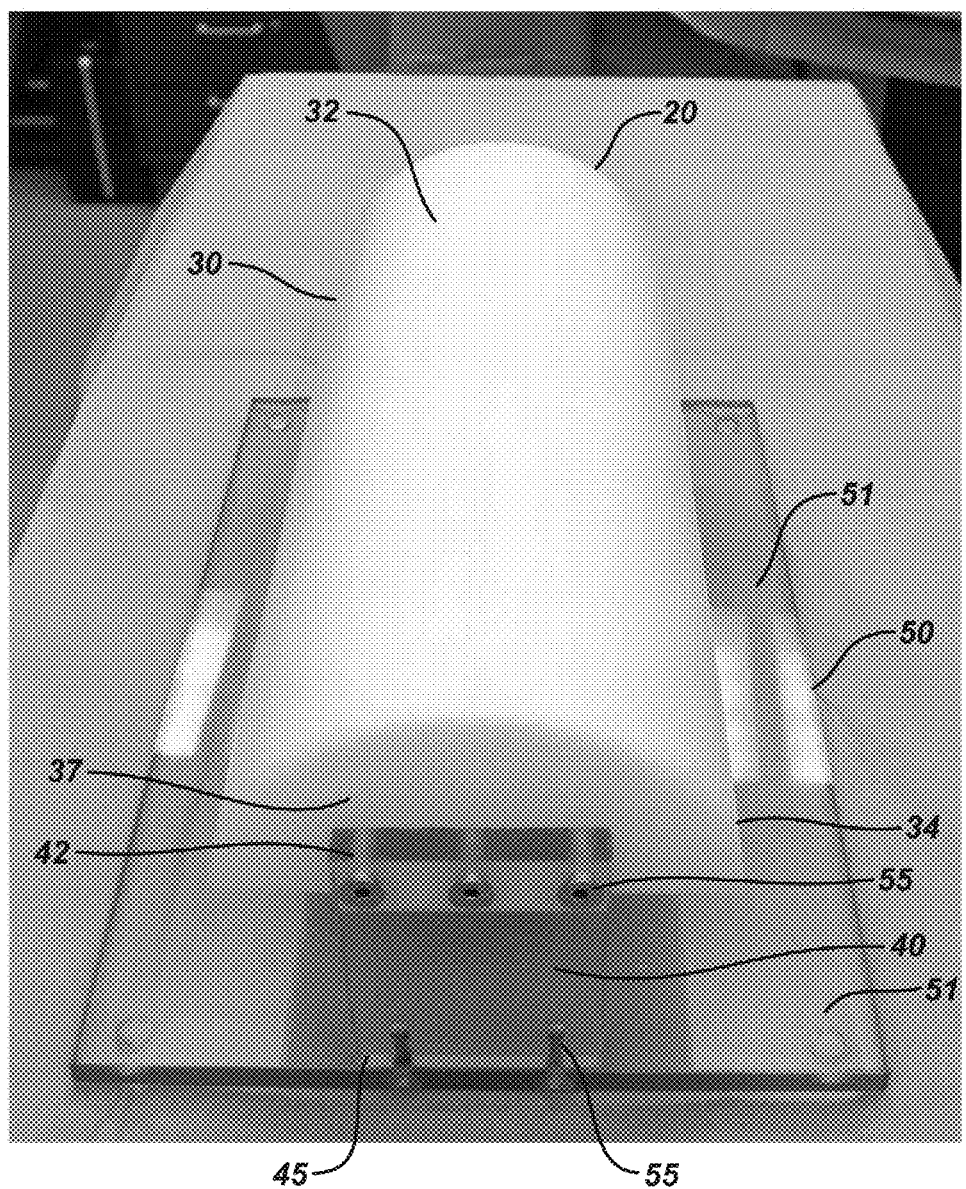
FIG. 2A is a photograph showing a perspective end view of an abdominal wall curvature approximator used in the systems of the present invention.
Figure 2C:
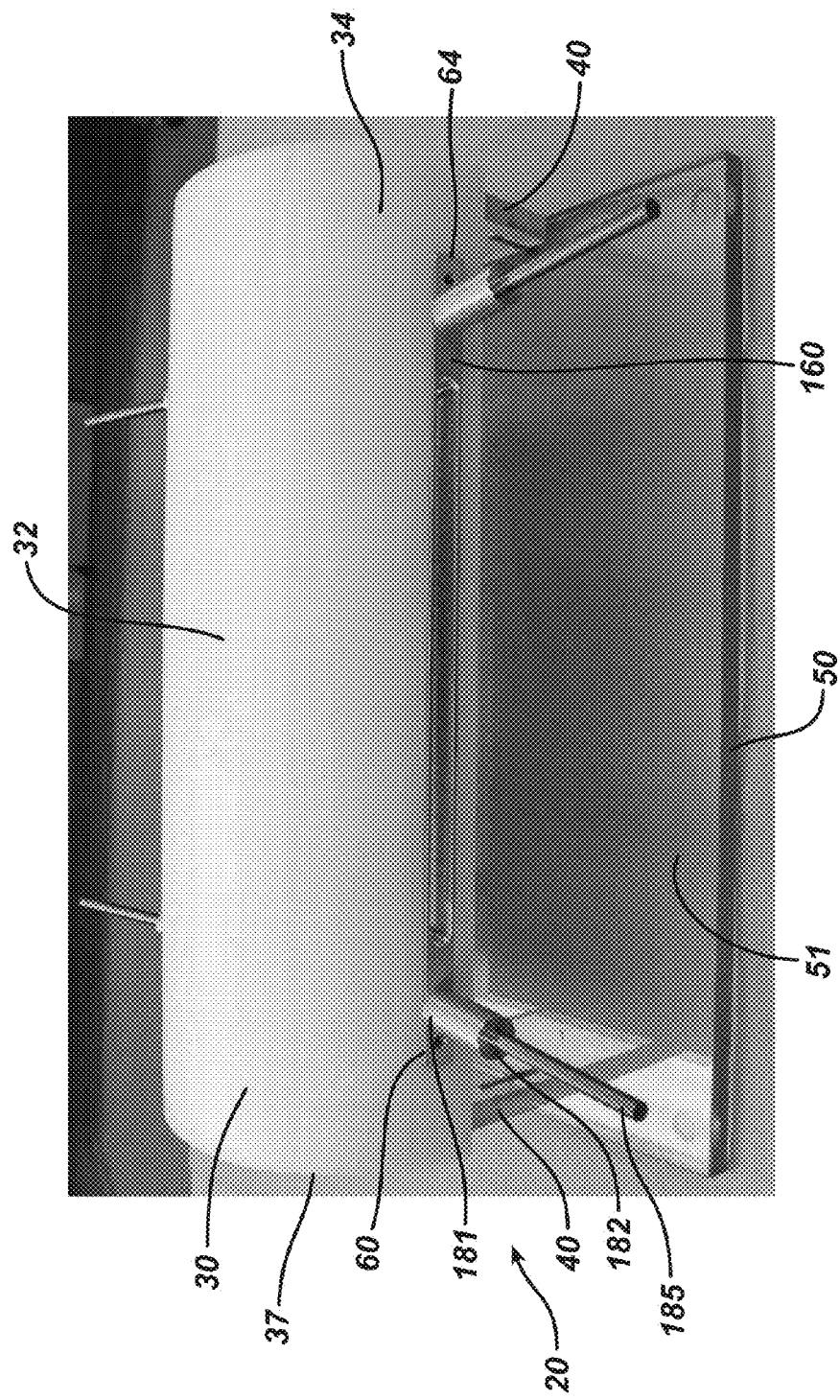
FIG. 2C is a photograph showing a side perspective view of the abdominal wall curvature approximator of FIG. 2A; receiver rails are seen to be mounted in the receiving slots on both sides of the approximator.
Figure 3A:
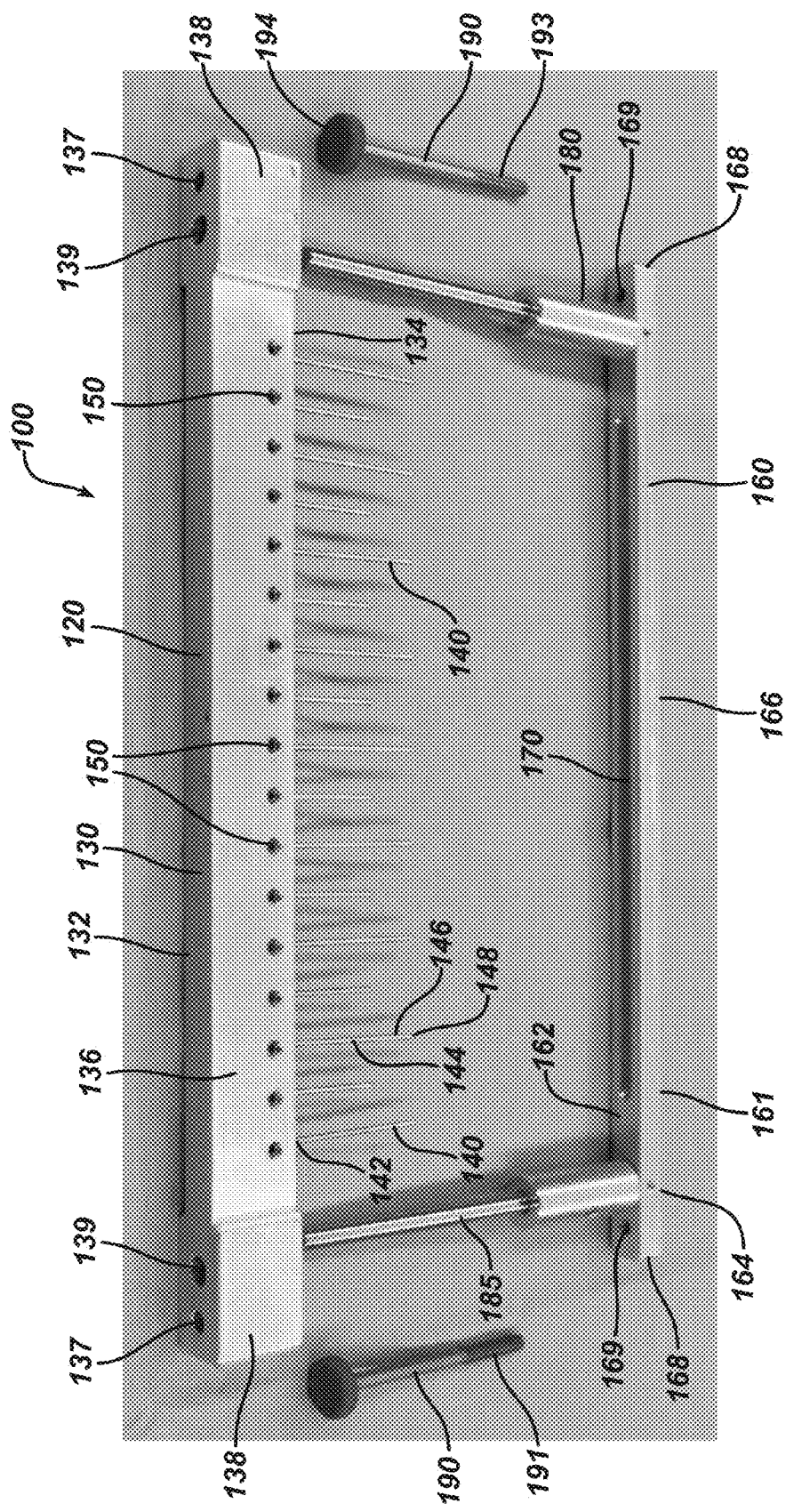
FIG. 3A is a top exploded perspective view of a tissue fixation system consisting of a pin rail and a receiver rail.
Figure 3B:
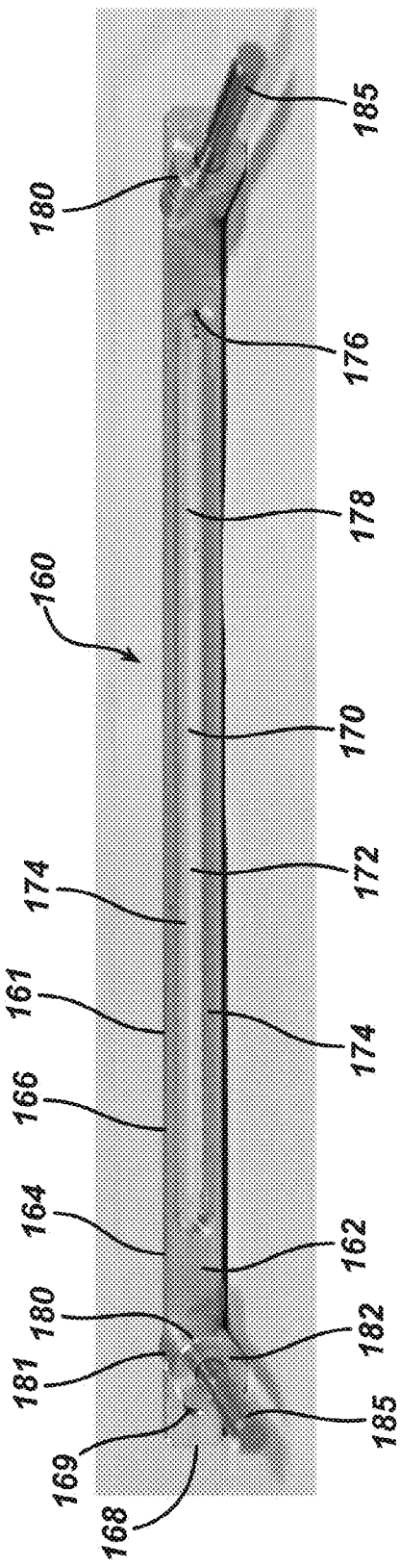
FIG. 3B is a side view of the receiver rail of FIG. 3A.
Figure 3C:
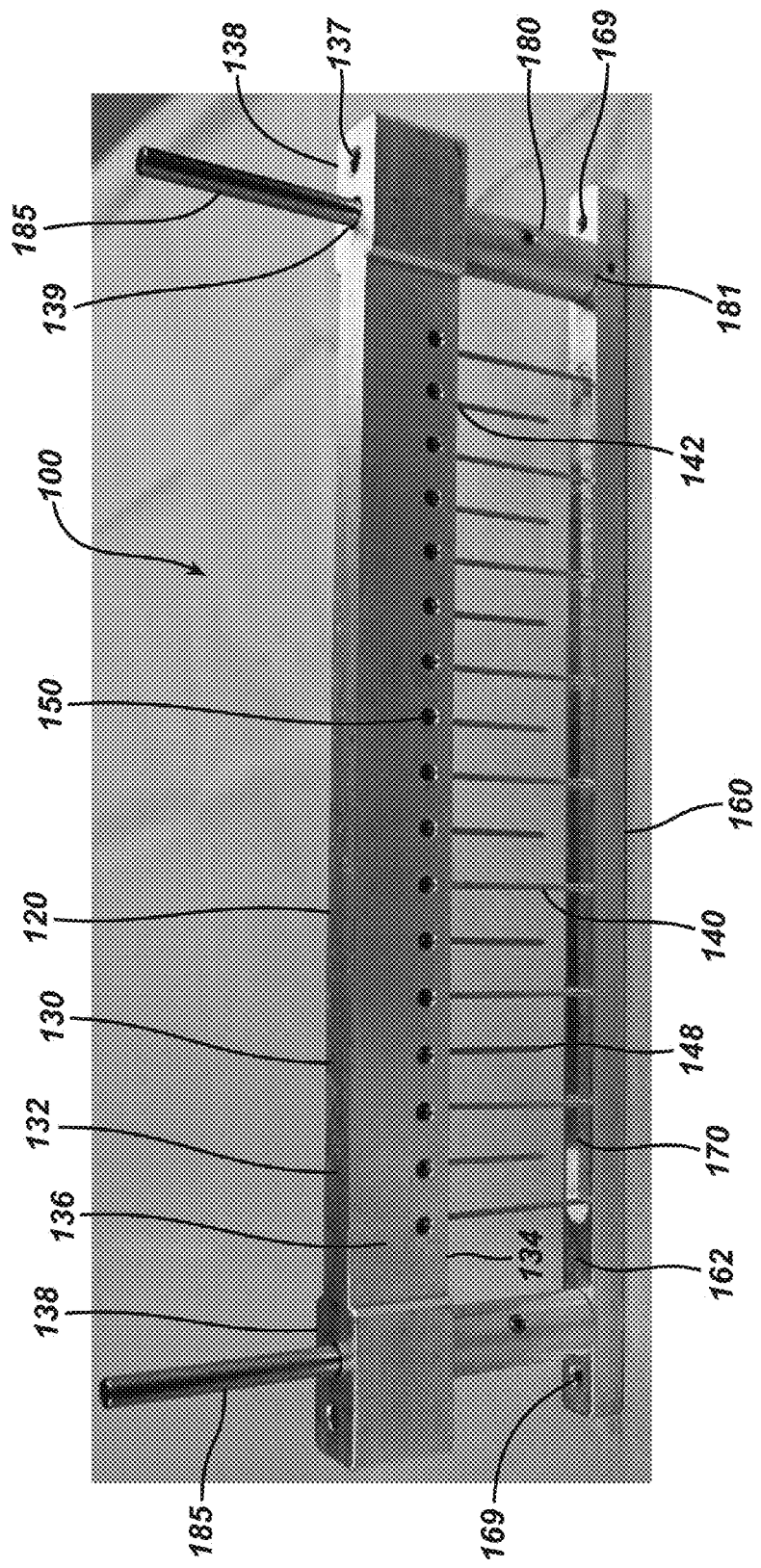
FIG. 3C is a side view of the tissue fixation system of FIG. 3A partially assembled.
Figure 3D:
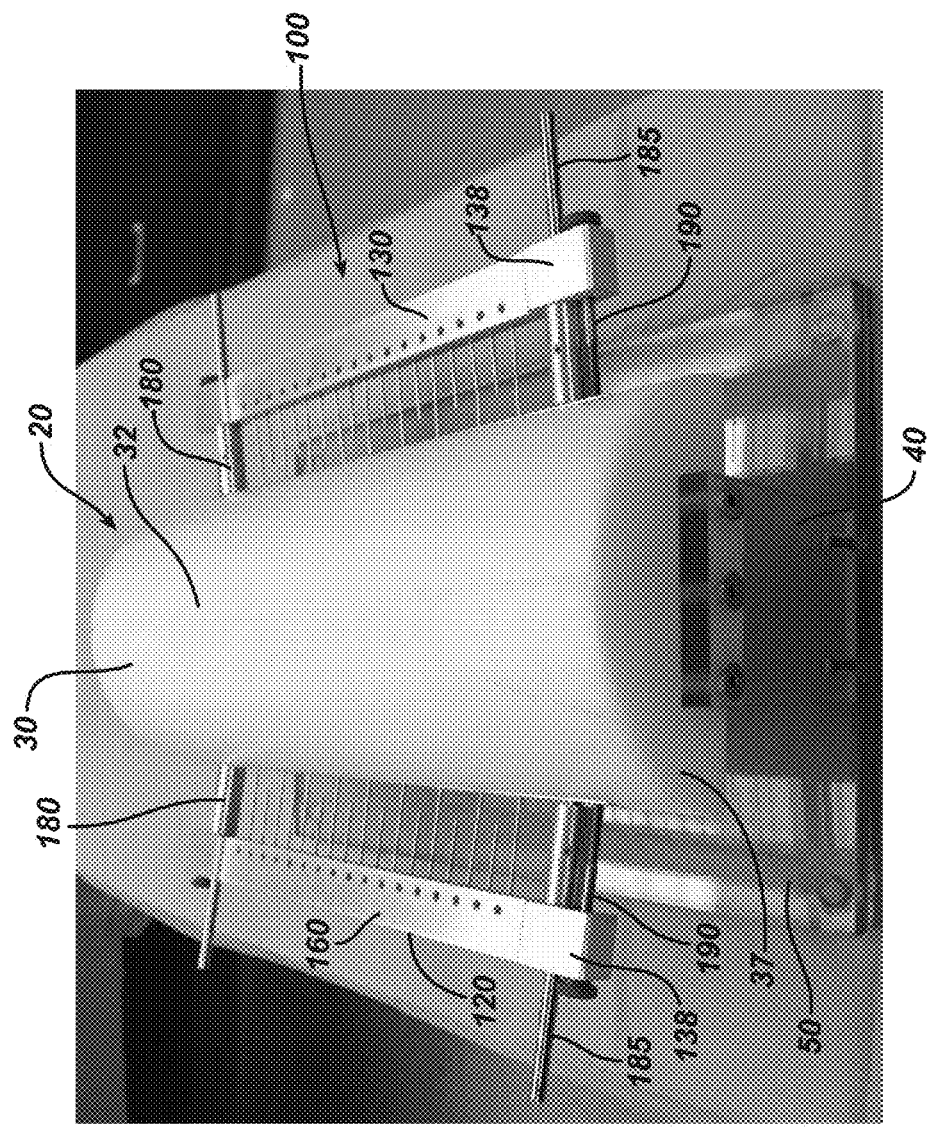
FIG. 3D is a perspective end view showing two of the tissue fixation systems of FIG. 3A assembled and mounted to the abdominal wall curvature approximator of FIG. 1A.
Figure 3E:
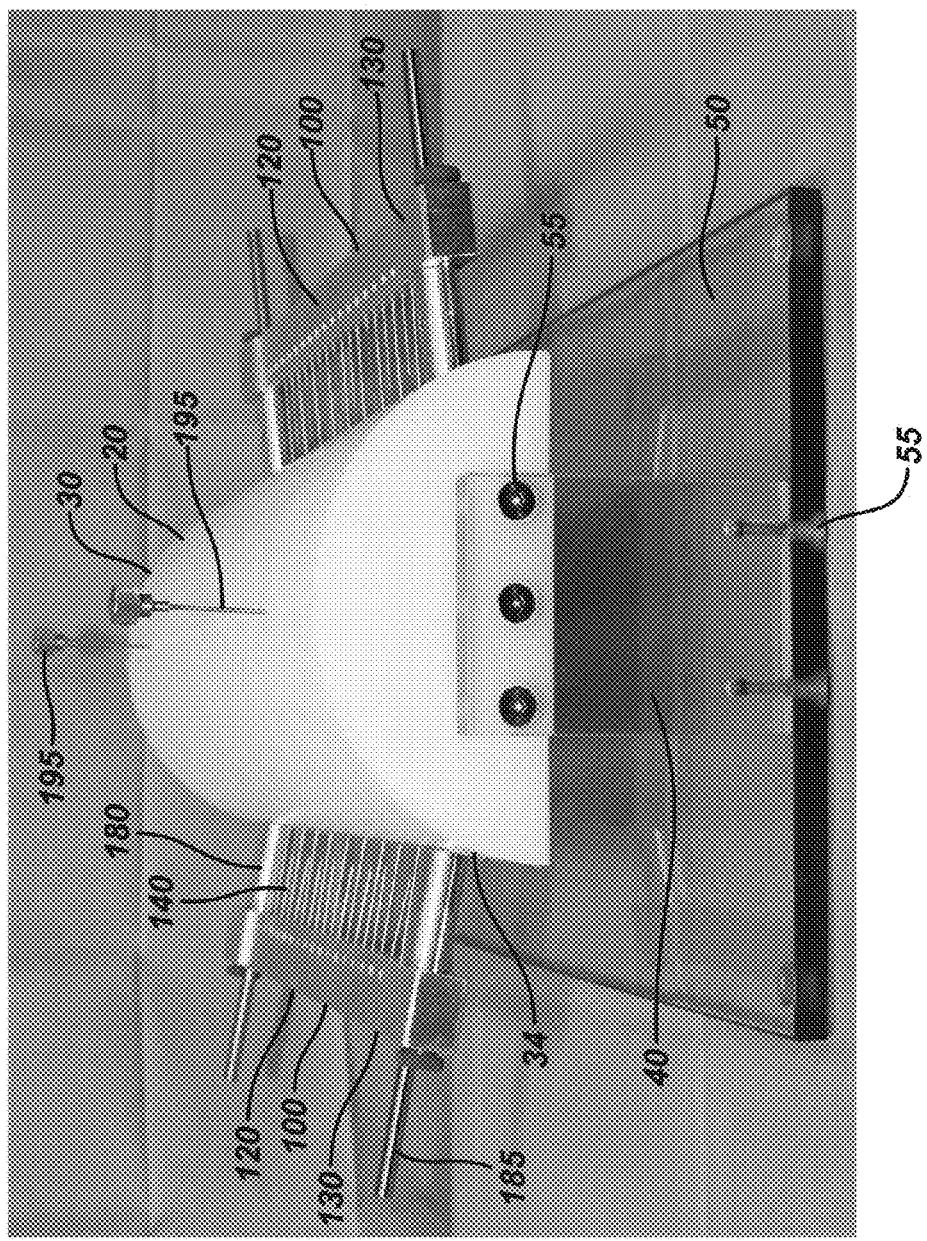
FIG. 3E is a photograph showing an end perspective view of the fixation system and approximator of FIG. 3B with two tissue retaining pins mounted in pin receiver holes on opposite ends of the top of the abdominal wall curvature approximator.
Figure 3F:
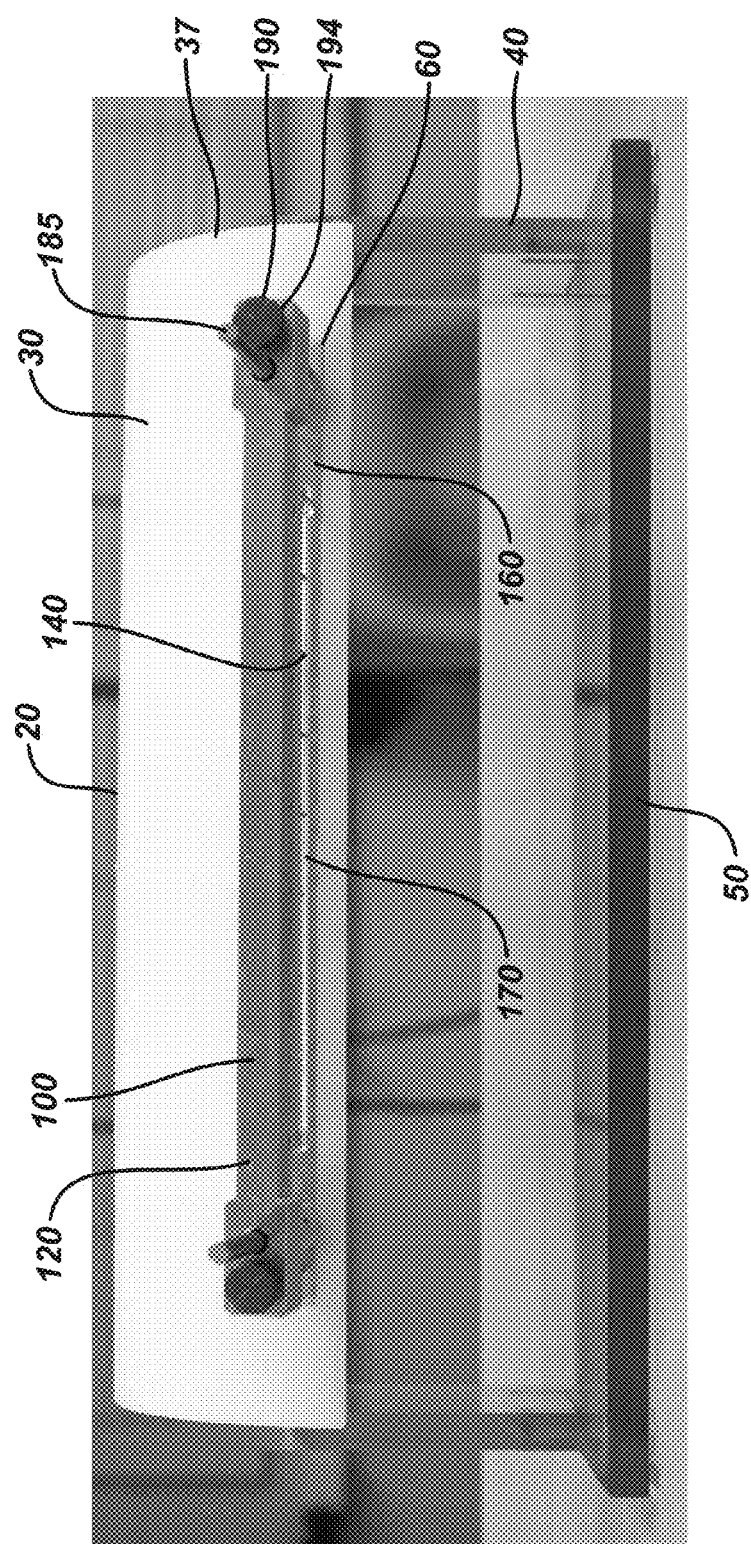
FIG. 3F is a side view of the abdominal wall curvature approximator of FIG. 3D with the pin rail mounted to the receiver rail.
Figure 6:
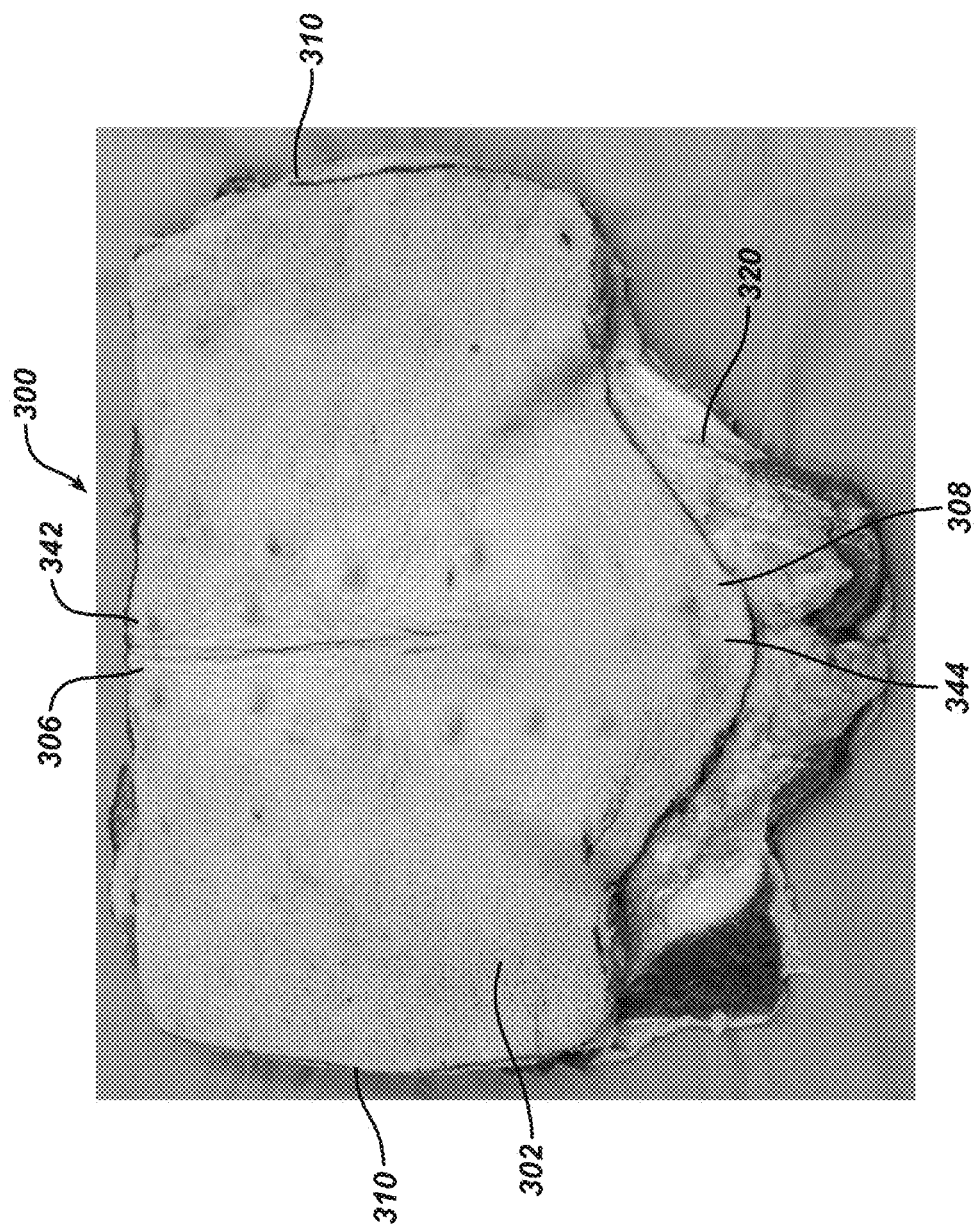
FIG. 6 is a photograph of an ex-planted mammalian abdominal wall specimen; the full thickness of specimen can be seen.
Figure 7:
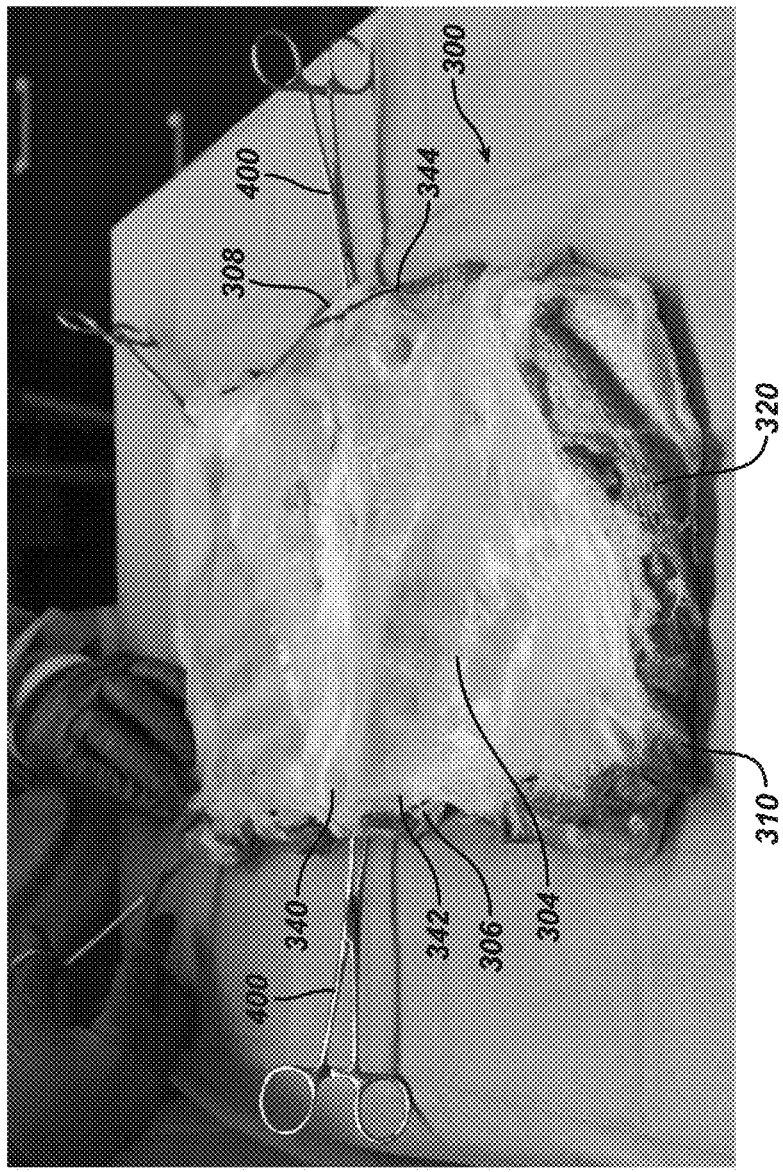
FIG. 7 illustrates the bottom peritoneal side of the specimen of FIG. 6. Tissue clamping instruments have been positioned at the cranial and caudal ends of the linea alba to aid in orientation of the specimen.
Figure 8A:
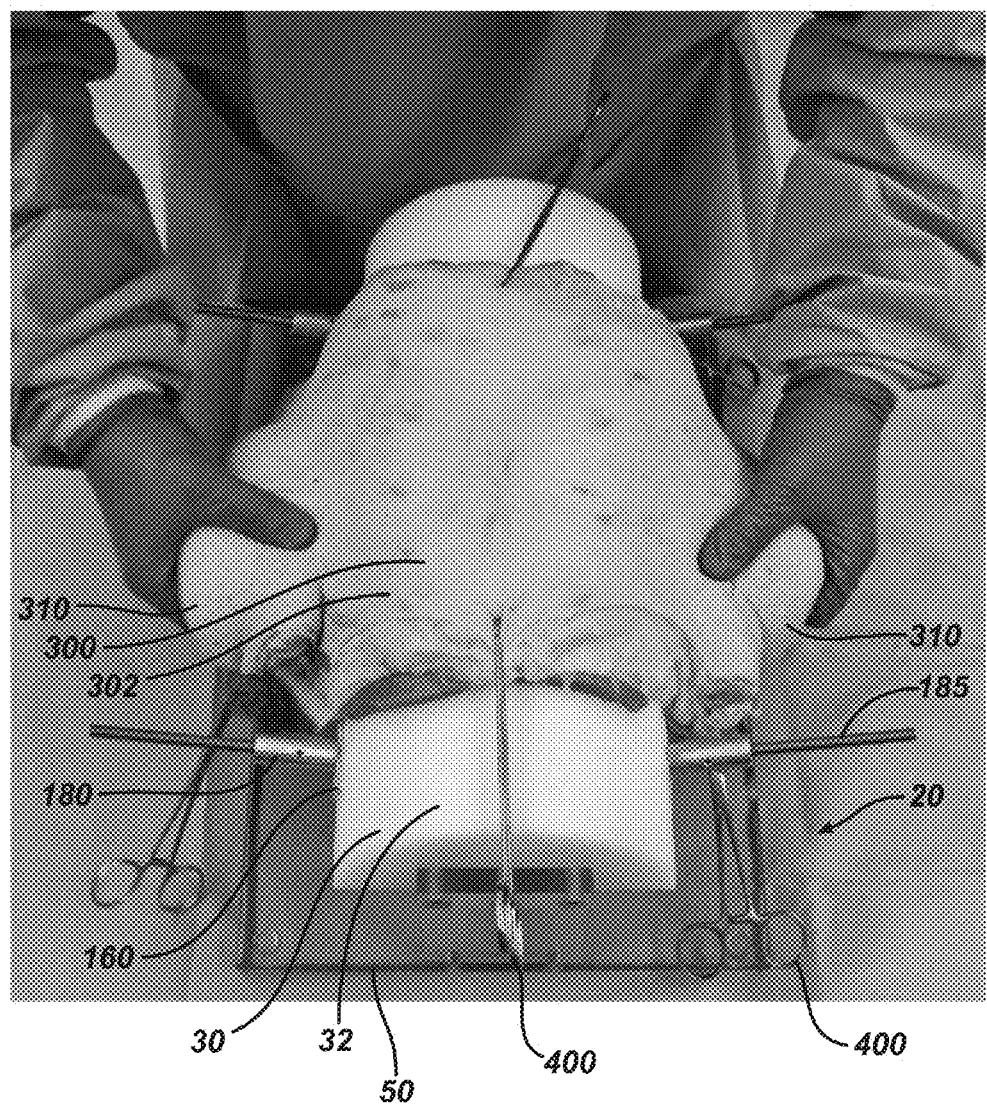
FIG. 8A shows the specimen of FIG. 7 being placed by the surgeon in position on top of the abdominal wall curvature approximator; the side receiver rails of the tissue fixation system are seen to be engaged in the side grooves of the approximator.
Figure 8B:
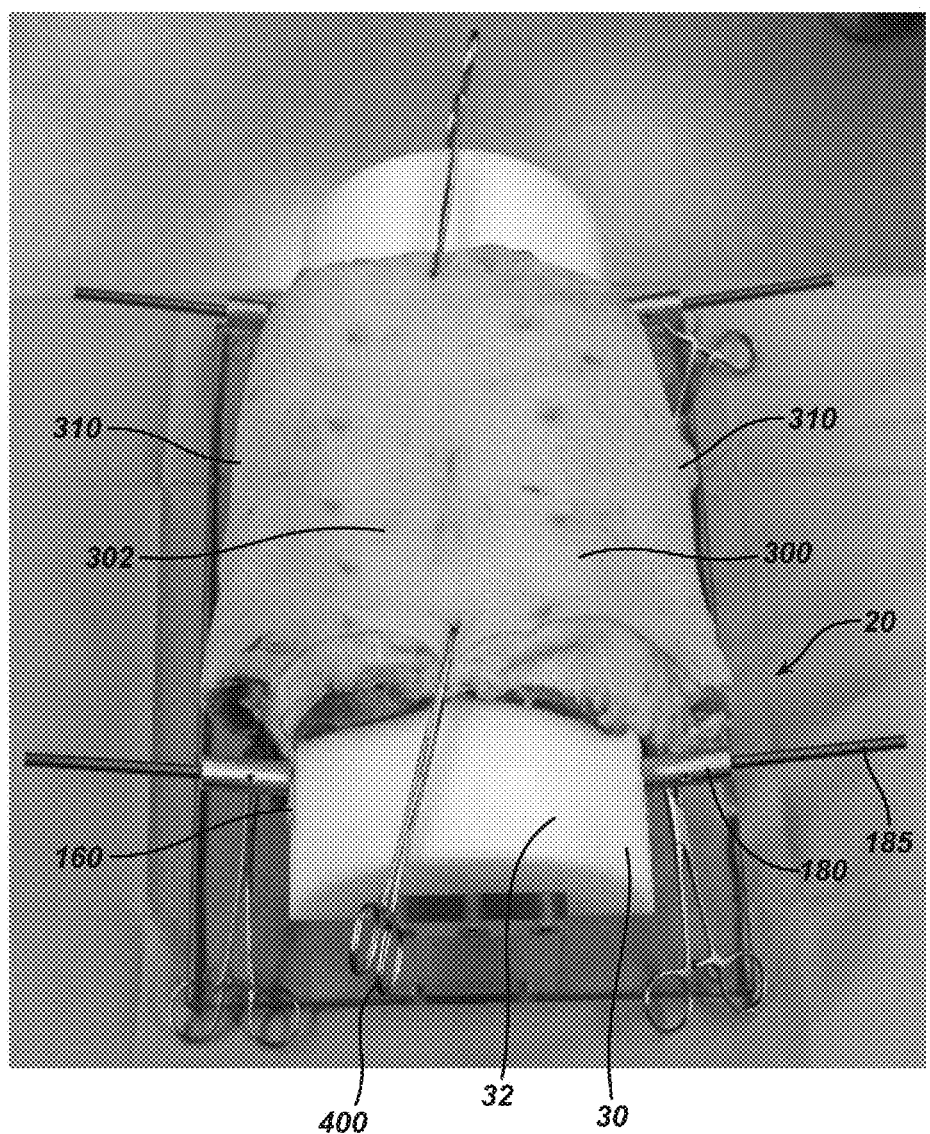
FIG. 8B shows the specimen of FIG. 8A in place on top of the abdominal wall curvature approximator.

The abdominal wound closure simulation model systems 10 of the present invention are used in the following manner. An abdominal wall tissue specimen 300 as seen in FIG. 6 was obtained from a commercial source (i.e., a slaughterhouse). For this example, a porcine model was utilized. The specimen 300 is seen to have top skin or dermal side 302 and bottom peritoneal side 304. The specimen is seen to have upper end 306, lower end 308 and lateral sides 310. The specimen is seen to have body wall thickness 320 having the following layers: dermis 350, subcutaneous adipose layer 360, muscle/fascia layers 370 and peritoneum 380. Referring to FIG. 7, the surgeon has turned the tissue specimen 300 of FIG. 6 upside down so that the peritoneal side 304 and peritoneum 370 is exposed. The surgeon has placed tissue clamps 400 onto the specimen 300 at the cranial and caudal ends 342 and 344 of the linea alba 340 in order to aid in orientation and alignment of the linea alba of the tissue specimen 300 when placed on top of the tissue mounting member 30 of the abdominal wall curvature approximator 20. The tissue approximator 20 is prepared to receive the tissue specimen 20 by initially mounting the receiver rails 160 to mounting member 30. The elongated members 161 of receiver rails 160 are placed into the receiving grooves 60 of the mounting member 30 as seen in FIGS. 2C and 2D. Next, as seen in FIG. 8A, the surgeon grasps the lateral sides 310 of tissue specimen 300 and rotates the specimen 300 such that the skin side 302 is facing up and the peritoneal side 304 is facing down. The surgeon then places the specimen 300 on the top surface 32 of the tissue mounting member 30 of abdominal wall curvature approximator 20 as seen in FIGS. 8A and 8B. The downwardly facing peritoneal side 304 and peritoneum 370 is touching the surface 32, while the top skin surface 302 and dermis 350 is exposed. The tissue specimen 300 is draped loosely on the tissue mounting member 30 of the approximator 20, aligning the clamps 400 with the centerline of the abdominal wall curvature approximator 20 and the tissue mounting member 30. The placement of the tissue specimen 300 on the tissue mounting member 30 and approximator 20 restores the anatomical shape to the tissue specimen 300 and abdominal wall 320, and aligns all layers of the tissue so that it is fixated in a neutral position with respect to the dermis 350 and peritoneum 370, as well as intermediary subcutaneous adipose layer 360 and muscle/fascia layers 370.

Figure 9B:
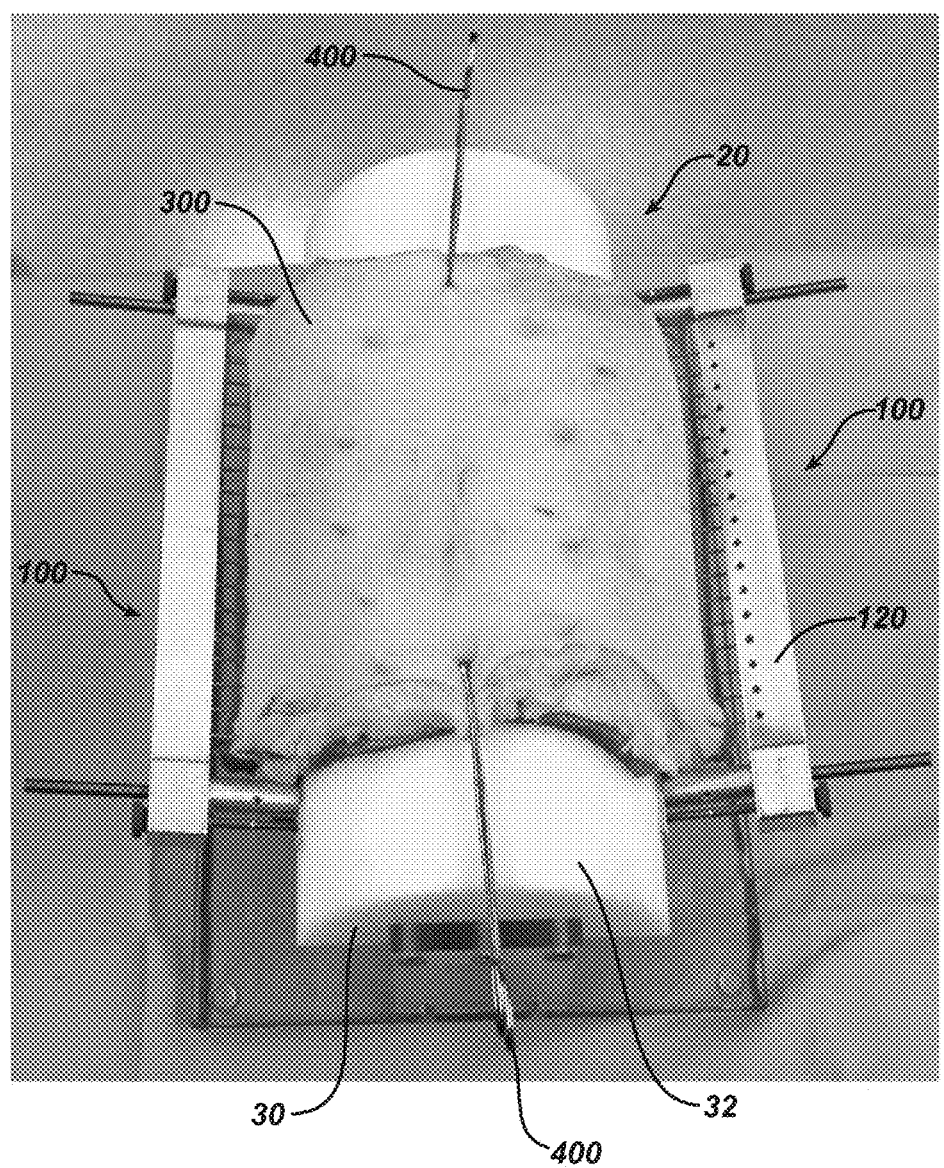
FIG. 9B is a top perspective view of the specimen of FIG. 9A on the approximator and engaged by two laterally mounted tissue fixation systems. The fixations systems are installed and the pin rails are secured to the receiver rails with screws.
Figure 10A:
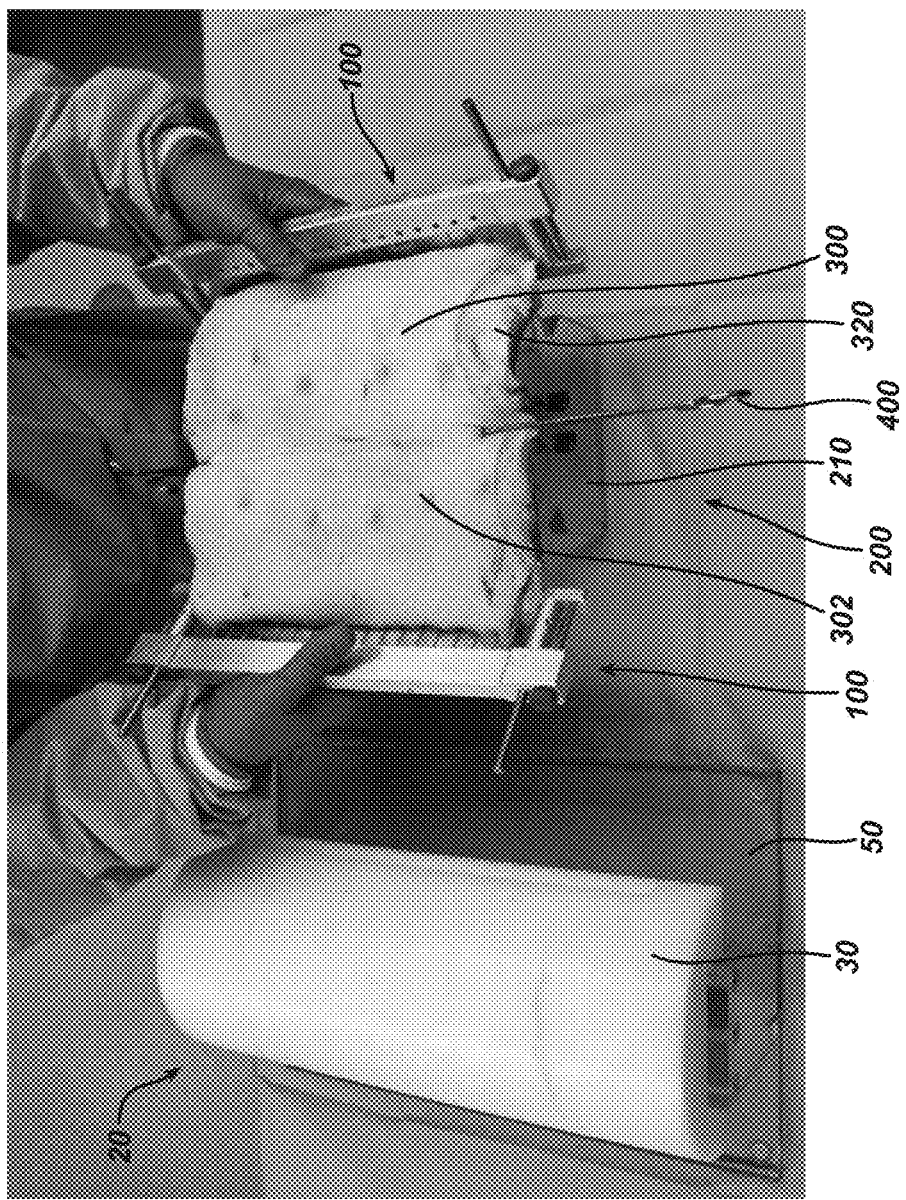
FIG. 10A shows the surgeon transferring the tissue specimen and tissue fixation systems to the tissue support and tensioner device.
Figure 10B:
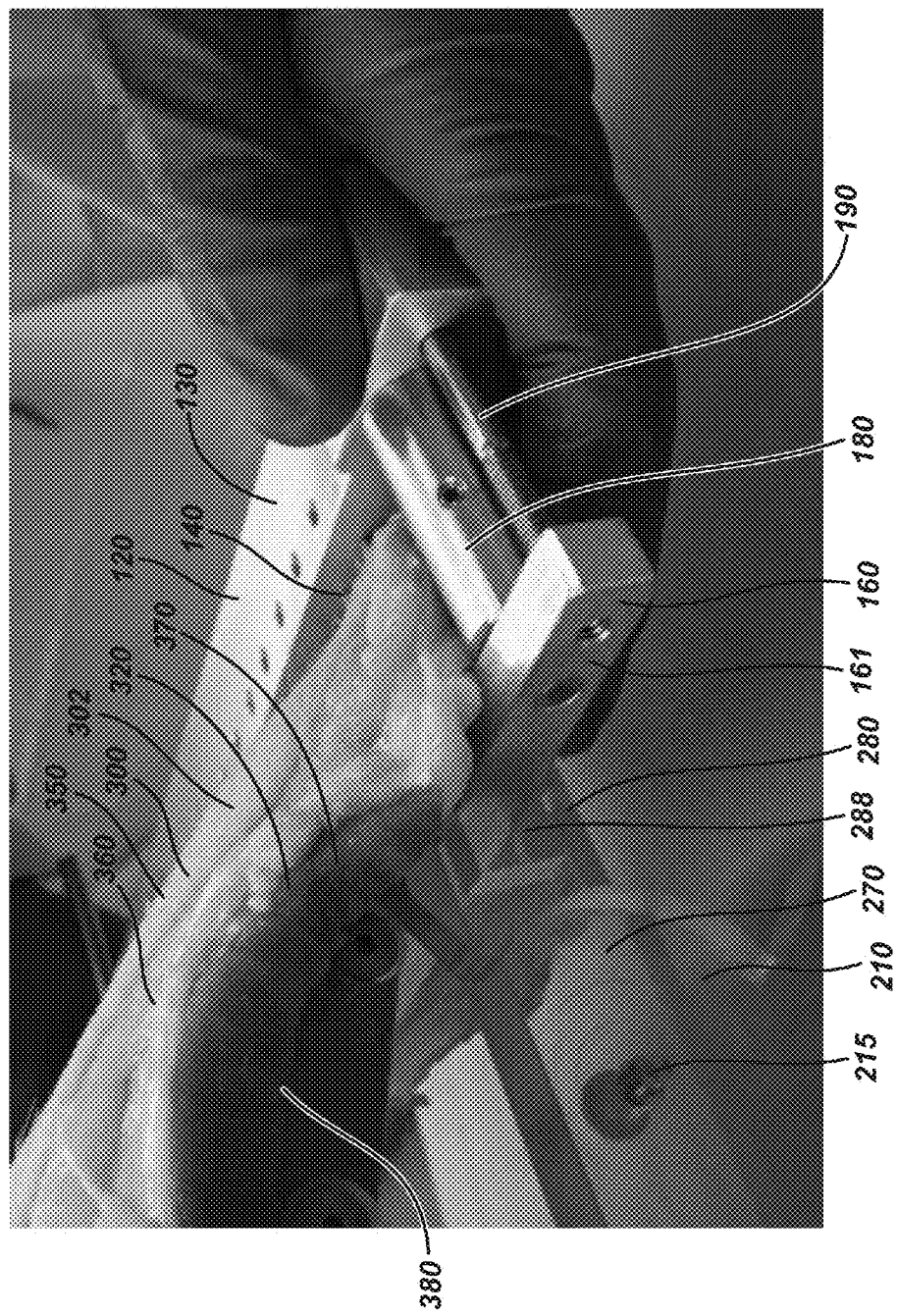
FIG. 10B is a close-up, partial perspective view showing the placement by the surgeon of the receiver rail into the receiving end of a tensioning adjustment arm of the tensioner device.

The surgeon then mounts the pin rail 120 of each tissue fixation system 100 to the receiver rails 160 by sliding the alignment pins 185 into the pin receiver openings 139 to form the tissue fixation system 100 as seen in FIGS. 3C-3F. The pin members 140 of the pin rails are manually forced into the tissue specimen 300 as seen in FIG. 9A by initially pushing the pin rail 120 toward receiver rail 169 to cause the piercing tips 148 of pin members 140 to pierce the tissue specimen with the pins 140 moving into the tissue specimen 300 until the pin rail member 130 contacts the tops 182 of stand-off members 180. The screws 190 are inserted through openings 137 and screwed into screw receiver openings 169 in order to tighten the pin rail 120 and the receiver rail 160 about the tissue specimen body wall 320 along the lateral sides 310 and to secure the pin rail 120 and receiver rail 160 together. Referring to FIG. 9B, both tissue fixation systems 100 are seen to have been mounted to the tissue specimen 300 and tightened sufficiently to effectively secure the systems 100 to the tissue specimen 300 between the receiver rail member 161 and the pin rail member 130 using the screws 190. The surgeon, as seen in FIG. 10A, then manually removes the tissue specimen 300 and attached tissue fixation systems 100 from the tissue mounting member 30 of the abdominal wall curvature approximator 20 and places the specimen 300 with peritoneal side 304 down onto the top of the tissue support and tensioner device 200 resting upon the top sides 242 of the tissue support members 240. The ends 168 of the receiver rails 160 are mounted to the tension adjuster arms 270 by pushing the end sections 168 of the receiver rails 160 into the gaps 288 between fork members 280 of the tension adjuster arms 270. The end sections 168 are maintained in the gaps 288 between fork members 280 by a mechanical friction force applied by the fork members 280. As seen in FIG. 10C, the specimen 300 along with the tissue fixation systems 100 have been mounted to the tensioner and support device 200. This end view of the tissue support and tensioner device 200 shows a tissue engagement pin 195, inserted through the tissue specimen 300 into the openings 215 in members 210 at the ends 306 and 308 of the tissue specimen 300. The tissue engagement end pins 195 secure the tissue specimen 300 to the tissue tensioner device 200 during tensioning, preventing any inward movement or contraction of the tissue specimen 300. The grid scales 235 having lines and numbers (1-5) 236 and 237, respectively, etched into or placed onto surface 216 of the side plate member 210 of the tissue support and tensioner device 200 provide recordable feedback during testing to record the level of tension applied to the tissue specimen 300 by adjusting the tension adjustment arms 270 during each wound closure application. The level of tension may be kept constant or varied during the testing.

Figure 11A:
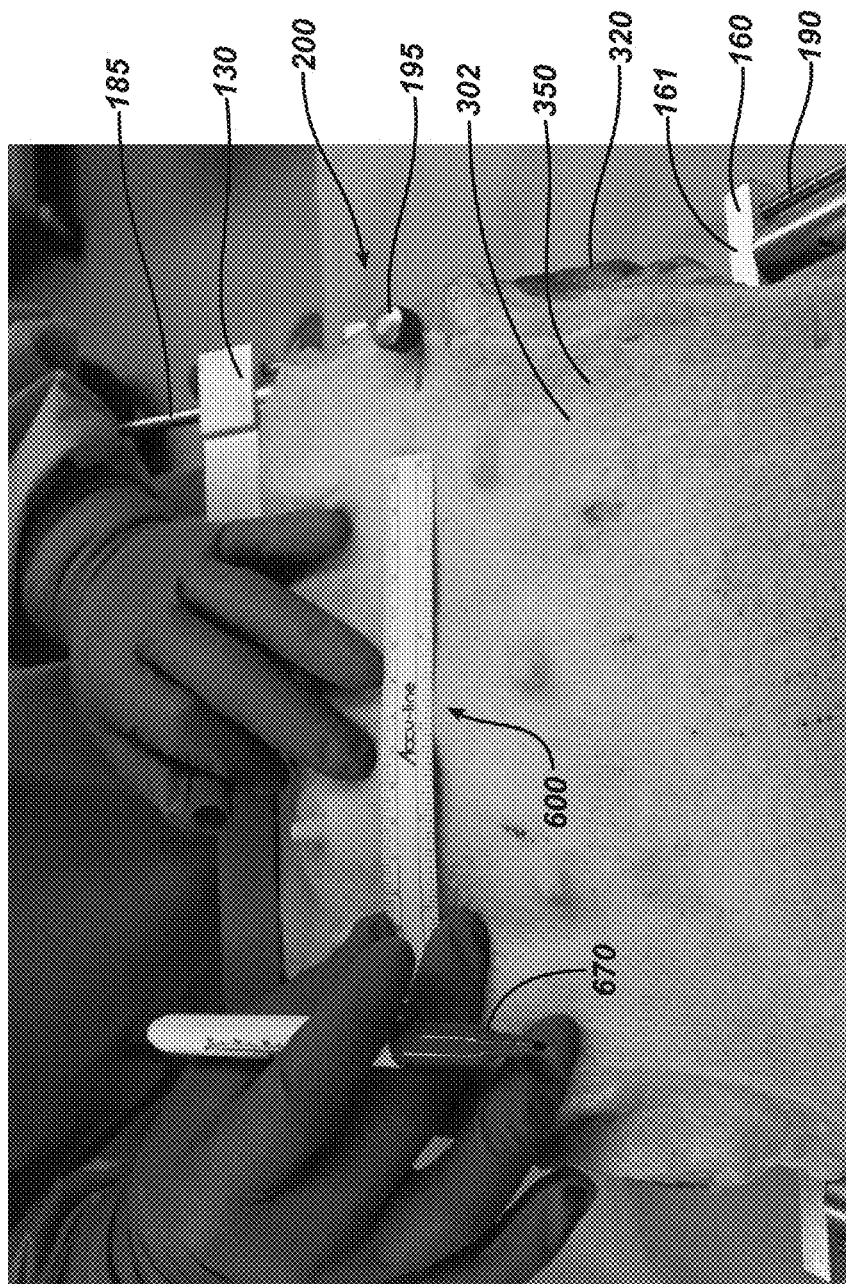
FIG. 11A shows the surgeon laying out the incision site on the tissue specimen for wound closure testing using a tissue marking device. The tissue specimen retains the normal anatomical abdominal curvature with all layers of the tissue aligned; the site is located over an open region of the underlying support and tensioner device.
Figure 11B:
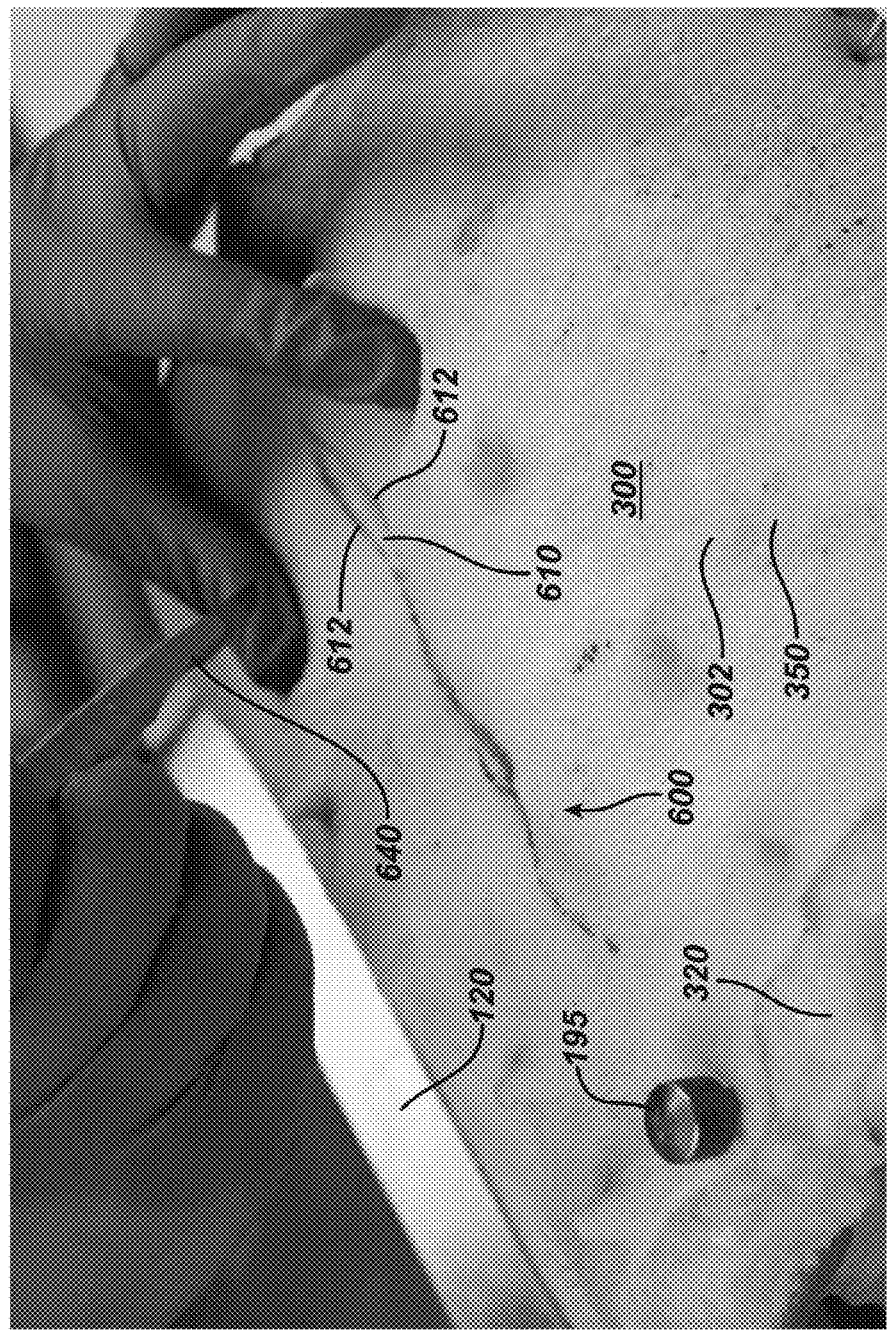
FIG. 11B shows an incision created by the surgeon in the tissue specimen; the tissue specimen is maintained such that the incision simulates an in vivo procedure.
Figure 12:
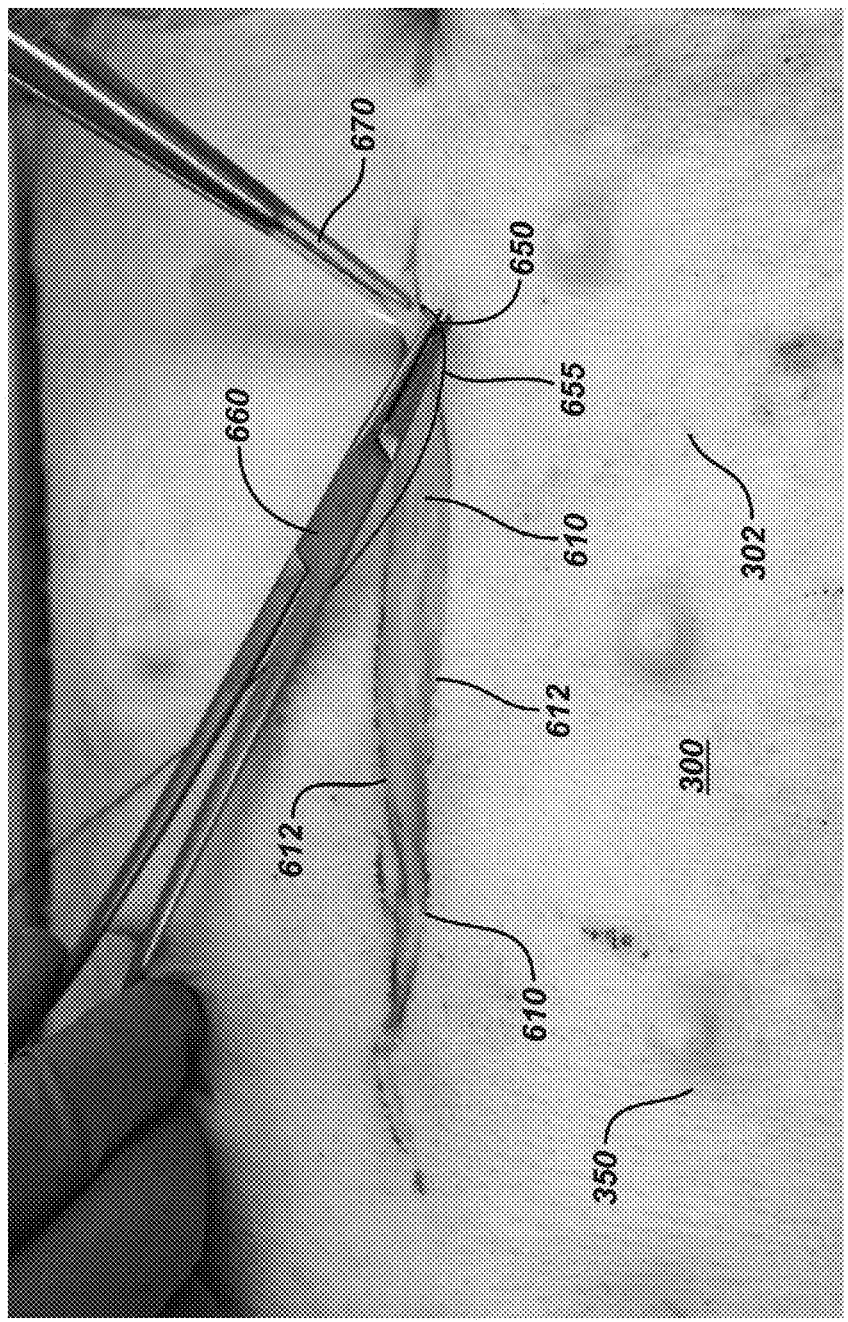
FIG. 12 shows the surgeon closing the incision using a surgical needle and suture.

Referring to FIGS. 11A and 11B, the incision site 600 for the wound closure testing is laid out on top skin surface 302 of tissue specimen 300 by the surgeon using a conventional tissue marker 670, such that the incision 610 will be positioned over the open region 250 of the underlying support and tensioning device 200 to allow the cutting device 640 (a conventional surgical scalpel), the surgical needle, or closure device to pass freely downwardly through peritoneal surface 304 into cavity 255 without hitting any structures. An incision of any depth may be created. As seen in FIG. 11B, the incision 610 passes through the outer skin surface 302 into underlying tissue subcutaneous layer 350 without passing completely through body wall 320. The incision 610 has opposed sides 612. The system allows both partial and full wall closure to be tested. The incision 610 is anatomically correct allowing for accurate simulation of wound closure. As seen in FIG. 12, the surgeon is suturing the incision 610 with a conventional surgical needle 650 having an attached surgical suture 655 and making multiple passes through the incision 610 to provide the necessary stitching to make the repair. The surgeon grasps the needle 650 with a conventional needle holder 660. The surgeon also uses a conventional tissue forceps 670 to move the sides 612 together while applying multiple stitches with the needle 650 and suture 655.

Figure 13A:
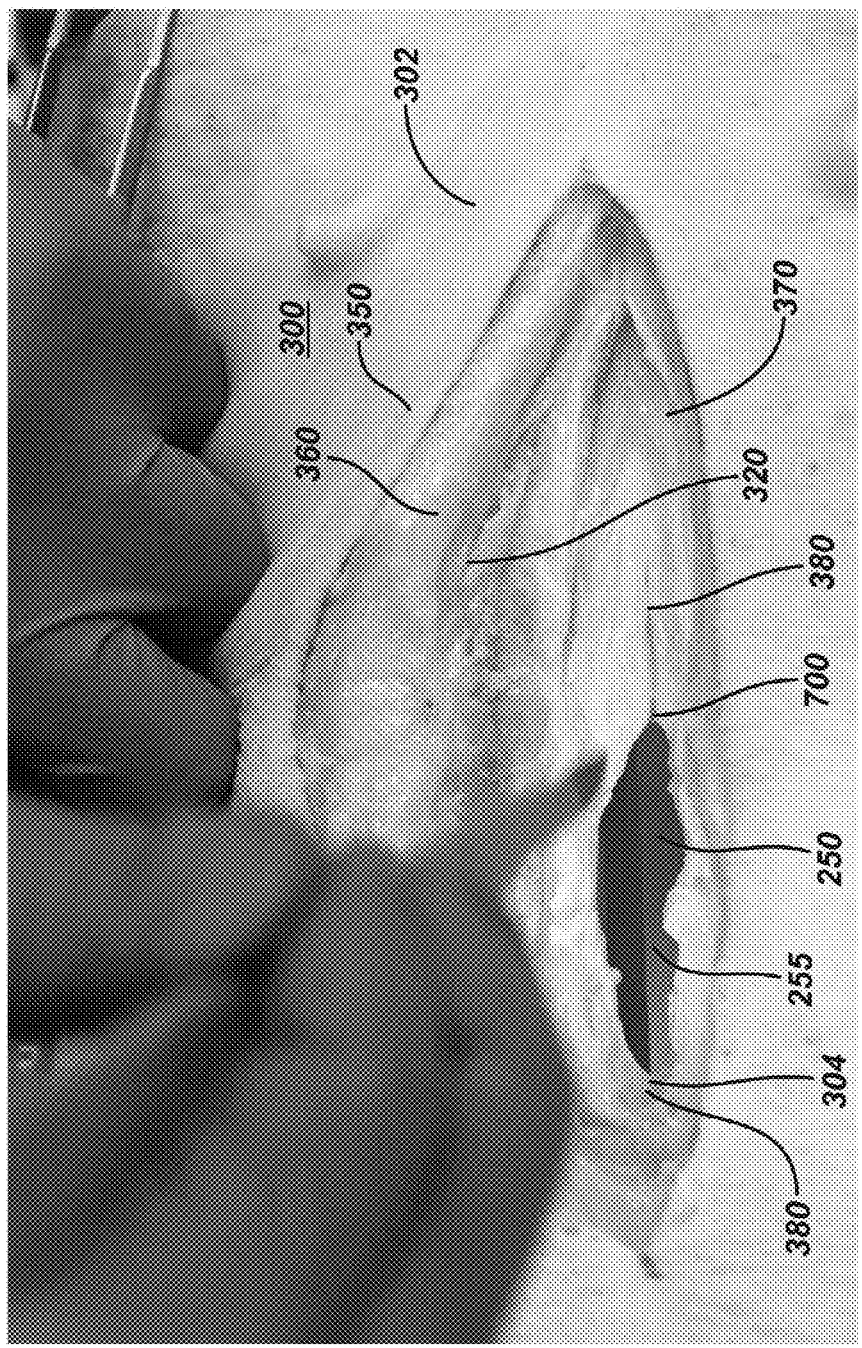
FIG. 13A shows a full wall defect in the specimen, enabling the testing of multi-layer closure using sutures or other closure devices.
Figure 13B:
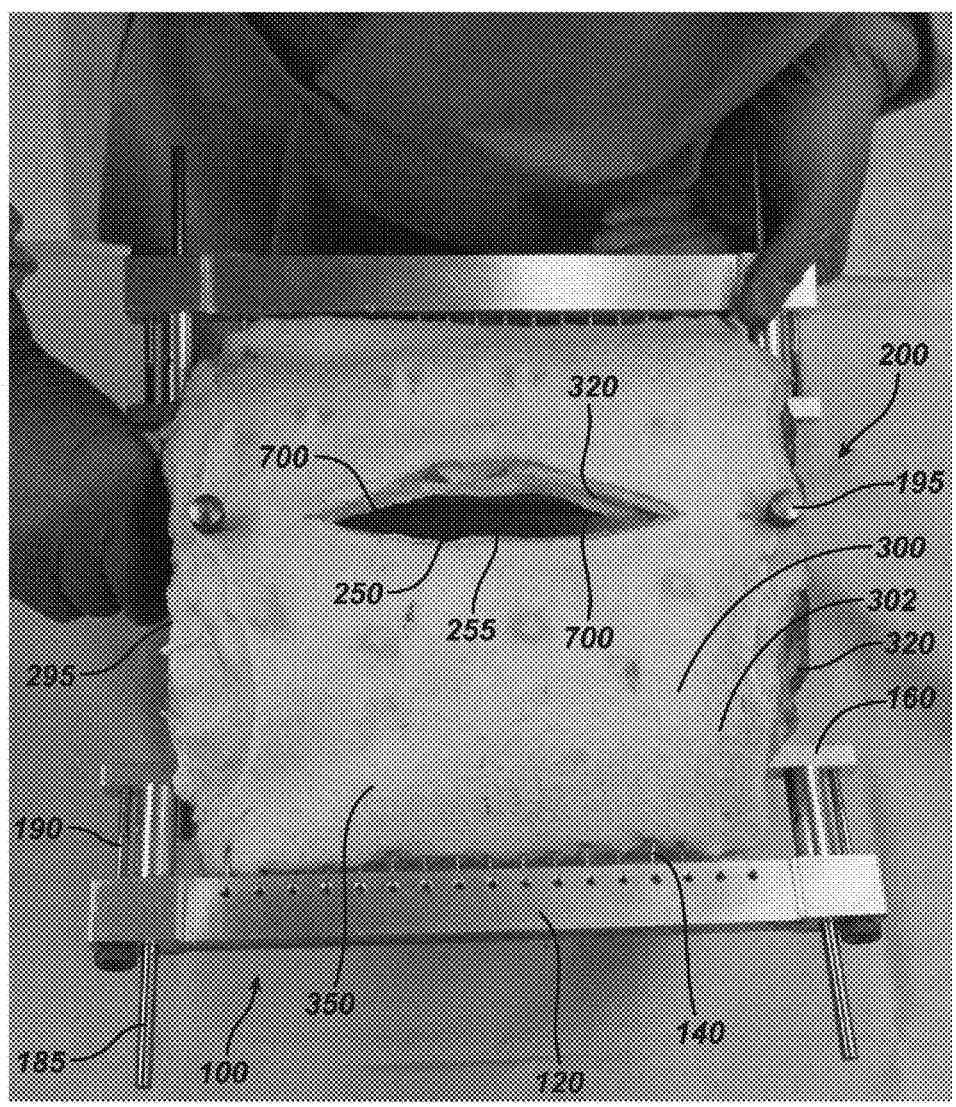
FIG. 13B shows the surgeon adjusting the tensioning arms to apply proper tension to the specimen to replicate a typical surgical condition; as shown, a full body wall defect. The tension may be varied during testing or kept constant depending upon the application or need. The level of tension applied may be recorded from the scale on each endplate.
Figure 14B:
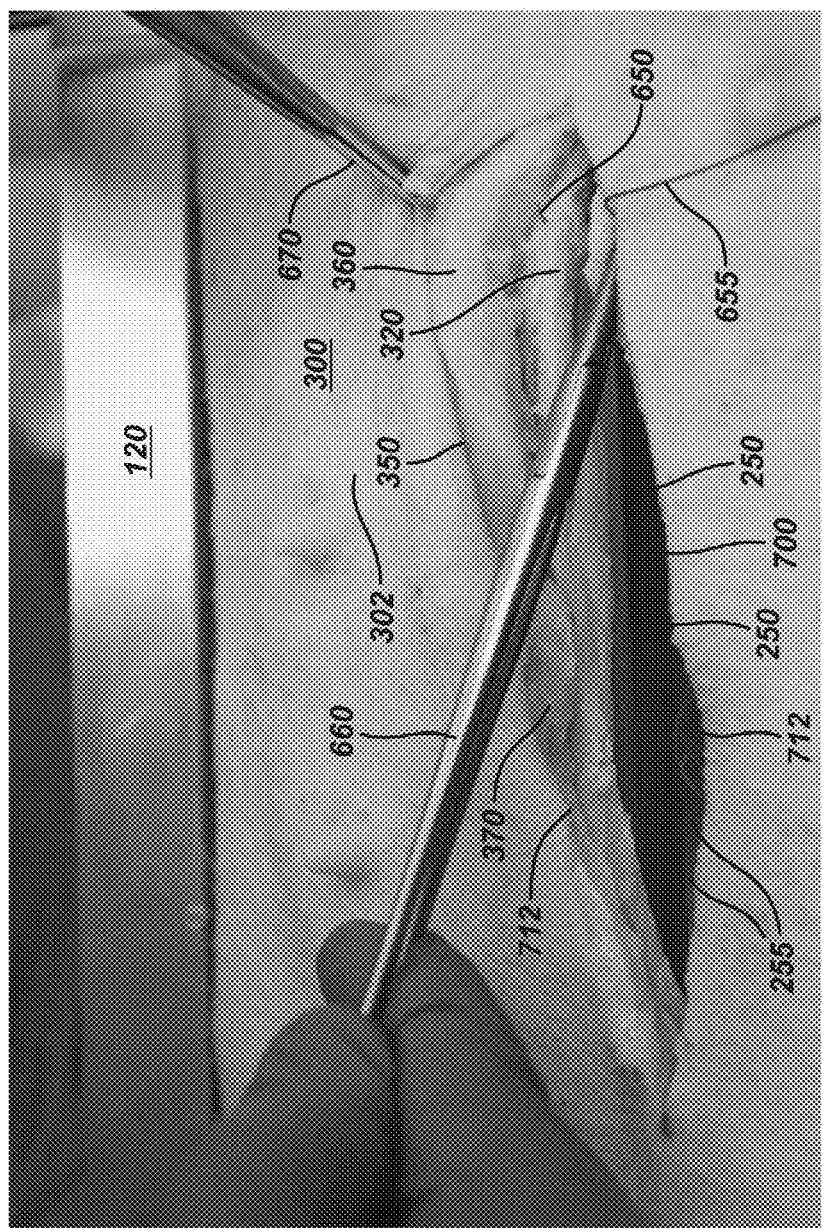

As seen in FIGS. 13A, 13B and 14A an anatomically correct full wall defect 700 has been made to the tissue specimen 300 having opposed sides 712 has been created, enabling testing of multilayer closures or novel closure devices on the tensioning device 200. The defect 700 is seen to extend through body wall 320 from outer skin surface 302 through dermis 350, subcutaneous adipose layer 360, muscle/fascia layers 370, peritoneum layer 380 and out of peritoneal surface 304. The proper tension may be applied to the tissue specimen 300 to replicate the surgical condition by adjusting the tensioning arms 270 and recording the level of tension from the scale engraved on each endplate. The tension may be varied during testing or kept constant depending upon the application or need. Referring to FIGS. 14A and 14B, the body wall defect 700 is closed in a surgically appropriate manner using a conventional surgical needle 650 and surgical suture 655 and conventional surgical instruments 660 and 670. The muscle/fascia layer 370 of specimen 300 in defect 700 is closed in a traditional interrupted suturing technique. During the closure, the defect 700 is maintained in an anatomically correct position accurately simulating an in vivo procedure.

If desired, the novel systems of the present invention may be used to simulate in vivo surgical procedures by medical professionals and students without applying wound closure devices. For example, practicing the making of partial and full body wall incisions using conventional surgical cutting devices such as scalpels, electrosurgical devices, ultrasonic devices, and lasers, and the like and equivalents thereof.

In an alternate embodiment, the system of the present invention may consist of only the tissue fixation system 100 and the support and tensioner device 200. For example, an abdominal wall tissue specimen 300 would be mounted directly on top of tensioner device 200, and the tissue fixation systems 100 would then be mounted to the tissue specimen 300, and the systems 100 would then be mounted to the tensioning arms 270 support and tensioner device 200.

Although the novel approximator and tensioning systems of the present invention have been described for use with anatomic tissue specimens, it is also possible to use synthetic tissue specimens made from natural and synthetic materials such as foams, rubbers, hydrogels, and various polymer materials, and the like. Examples of commercially available, useful synthetic tissue specimens include but are not limited to skin models available from The Chamberlain Group, Great Barrington, Mass. and Syndaver Labs, Tampa, Fla. Similar benefits accrue to the user when using a synthetic tissue specimen with the novel systems of the present invention.

Although not shown, the novel systems of the present invention may be combined with mechanisms or systems to move the specimen 300 when mounted to the tensioning system 200 to simulate a breathing movement in the tissue specimen 300. This may be done in a variety of conventional manners including mechanisms, bladders, gas pulses, etc.

The novel systems and methods of the present invention have many advantages. The systems provide for the fixation of tissue with full wall thickness pins. The pins completely penetrate the full thickness tissue and secure it in place with minimal squeezing or slippage at the contact surface. The pins align into a receiver rail to securely hold the tissue in place during manipulation. The use of multiple fixation pins reduces the discrete points of fixation. The known conventional testing systems employing discrete points of fixation artificially create lines of tension when mounting the harvested tissue sample. The multiple fixation points used in the tissue fixations systems of the present invention securely mount the tissue without creating regions of increased tension. The multitude of the fixation pins creates a line of fixation along the harvested tissue sample. The anatomical shape factor of the tissue specimen, such as a body wall, is secured during the fixation process. The abdominal wall curvature approximator preserves the anatomic shape of the harvested tissue during the fixation process to ensure the pins are perpendicular to the full thickness layers. Without preserving the anatomical shape, the levels of tension on the interior tissue layers will be unequal, creating regions of more or less tension during the final mounting fixture. Variable tensioning of tissue is provided by the system of the present invention. The tissue support and tensioner provides several levels of tension capabilities on the caudal/cranial and medial/lateral aspects of the harvested tissue sample. Underlying tissue support is provided to maintain anatomical structural integrity. This provides support during the tissue mounting, preventing any tissue sagging or hammocking Multi-layer closure is provided by the novel system of the present invention with all fixation methods (e.g. suture, staples, topical adhesives, etc.). The resulting consistent multi-layer model allows for multiple products or techniques to be assessed. The novel systems of the present invention allow for accurate ex vivo simulation of in vivo wound closure. This allows for accurate testing and assessment of wound closure devices and procedures to assist in the development of improved wound closure devices and procedures. The novel systems also provide an improved way for clinicians and students to practice wound closure techniques and improve wound closure skills. The system provides for anatomically correct presentation and tensioning on anatomic tissue specimens such as abdominal wall tissue samples for ex-vivo wound closure simulation, and other surgical procedure simulations. The novel systems of the present invention may be used on both natural, harvested anatomic tissue specimens and synthetic tissue specimens or samples.

Although this invention has been shown and described with respect to detailed embodiments thereof, it will be understood by those skilled in the art that various changes in form and detail thereof may be made without departing from the spirit and scope of the claimed invention.

We claim:

1. An ex vivo anatomic tissue specimen simulation system, comprising:
    a tissue specimen curvature approximator device for a tissue specimen comprising an approximator member, the approximator member having opposed ends, a top surface having a curvature, and a bottom surface, wherein the curvature of the top surface corresponds to the curvature of a tissue specimen in vivo; and, a support structure mounted to the member;
    a tissue fixation system, comprising a pin rail, the pin rail having an elongated member with a plurality of tissue engagement pins mounted on a surface; and,
    a receiver rail for engaging the pin rail, the receiver rail having an elongated receiver rail member with at least one standoff member and at least one guide pin, and a groove along at least part of the length of the elongated member for receiving distal ends of the tissue engagement pins; and,
    a tissue support and tensioner device for receiving at least a part of the tissue fixation system, comprising at least one tissue support member having a curvature, the curvature corresponding to the curvature of a tissue specimen in vivo, a pair of end plate members mounted to the ends of the tissue support member, a pair of tensioning arms pivotally mounted to each plate member, and members extending from the lateral ends of the tensioning arms to receive at least a section of the receiver rail.

2. The system of claim 1, wherein the approximator device has a flat bottom.

3. The system of claim 1, wherein the end plate members are mounted to the ends of the approximator member.

4. The system of claim 1, wherein the approximator member additionally comprises a groove for receiving the receiver rail member.

5. The system of claim 1, wherein the pin rail member has at least one opening for receiving a guide pin member.

6. The system of claim 1, additionally comprising a screw member for securing the pin rail to the receiver rail.

7. The system of claim 1, wherein the end plate members have a numbered grid.

8. The system of claim 1, wherein the tensioning arms have an associated locking mechanism.

9. The system of claim 1, wherein the tensioner device comprises an accessible cavity below the tissue support member.

10. The system of claim 1, comprising two tissue support members separated by an opening.

11. The system of claim 1, wherein the tissue specimen comprises a body wall.

12. The system of claim 1, wherein the tissue specimen comprises an abdominal wall.

13. A method for simulating an ex-vivo anatomic tissue specimen wound closure using the system of claim 1, comprising:
    mounting a section of a tissue specimen onto the tissue specimen curvature approximator device, the tissue specimen having lateral sides;
    attaching a tissue fixation system to each lateral side of the tissue specimen;
    mounting the tissue specimen and each attached tissue fixation system to the tissue support and tensioning device and tensioning the tissue specimen using the tensioning arms;
    making an incision in at least one section of the tissue specimen; and,
    applying a tissue closure device.

14. The method of claim 13, wherein the tissue closure device is selected from the group consisting of surgical sutures, surgical staples, adhesives, glues, and tacks.

15. A method for simulating an ex-vivo anatomic tissue specimen surgical procedure using the system of claim 1, comprising:
    mounting a section of a tissue specimen onto the tissue specimen curvature approximator device, the tissue specimen having lateral sides;
    attaching a tissue fixation system to each lateral side of the tissue specimen;
    mounting the tissue specimen and each attached tissue fixation system to the tissue support and tensioning device and tensioning the tissue specimen using the tensioning arms; and,
    making an incision in at least one section of the tissue specimen.

16. The method of claim 13, wherein the incision is made using a surgical instrument selected from the group consisting of mechanical cutting devices, electrosurgical cutting devices, laser cutting devices and ultrasonic cutting devices.

17. The method of claim 13, wherein the closure device comprises a suture.

18. The method of claim 15, wherein the incision is made using a surgical instrument selected from the group consisting of mechanical cutting devices, electrosurgical cutting devices, laser cutting devices, and ultrasonic cutting devices.

19. The method of claim 13, wherein the tissue specimen comprises a harvested natural tissue.

20. The method of claim 13, wherein the tissue specimen comprise synthetic tissue.

21. The method of claim 15, wherein the tissue specimen comprises a harvested natural tissue.

22. The method of claim 15, wherein the tissue specimen comprise synthetic tissue.

23. The method of claim 13, wherein the tissue specimen comprises a body wall.

24. The method of claim 13, wherein the tissue specimen comprises an abdominal wall.

25. The method of claim 15, wherein the tissue specimen comprises a body wall.

26. The method of claim 15, wherein the tissue specimen comprises an abdominal wall.

27. An ex vivo anatomic tissue specimen simulation system, comprising:
   a tissue fixation system, comprising a pin rail, the pin rail having an elongated member with a plurality of tissue engagement pins mounted on a surface; and,
   a receiver rail for engaging the pin rail, the receiver rail having an elongated receiver rail member with at least one standoff member and at least one guide pin, and a groove along at least part of the length of the elongated member for receiving distal ends of the tissue engagement pins; and,
   a tissue support and tensioner device for receiving at least a part of the tissue fixation system, comprising at least one tissue support member having a curvature, the curvature corresponding to the curvature of a tissue specimen in vivo, a pair of end plate members mounted to the ends of the tissue support member, a pair of tensioning arms pivotally mounted to each plate member, and members extending from the lateral ends of the tensioning arms to receive at least a section of the receiver rail.

28. The system of claim 27, wherein the tensioner device comprises an accessible cavity below the tissue support member.

29. The system of claim 27, comprising two tissue support members separated by an opening.

30. The system of claim 27, wherein the end plate members have a numbered grid.

31. The system of claim 27, wherein the tensioning arms have an associated locking mechanism.

32. The system of claim 27, wherein the tissue specimen comprises a body wall.

33. The system of claim 27, wherein the tissue specimen comprises an abdominal wall.

\* \* \* \* \*